(12) United States Patent
Baarman et al.

(10) Patent No.: US 10,868,443 B2
(45) Date of Patent: Dec. 15, 2020

(54) SELECTABLE COIL ARRAY

(71) Applicant: Philips IP Ventures B.V., Eindhoven (NL)

(72) Inventors: David W. Baarman, Fennville, MI (US); Colin J. Moore, Lowell, MI (US); Joshua B. Taylor, Rockford, MI (US); Scott A. Mollema, Rockford, MI (US); William T. Stoner, Jr., Ada, MI (US); Benjamin C. Moes, Wyoming, MI (US)

(73) Assignee: Philips I.P. Ventures B.V., Eindhoven (NL)

( * ) Notice: Subject to any disclaimer, the term of this patent is extended or adjusted under 35 U.S.C. 154(b) by 0 days.

(21) Appl. No.: 14/953,881

(22) Filed: Nov. 30, 2015

(65) Prior Publication Data
US 2016/0134154 A1    May 12, 2016

Related U.S. Application Data

(63) Continuation of application No. 12/756,271, filed on Apr. 8, 2010, now Pat. No. 9,231,411.

(Continued)

(51) Int. Cl.
*H02J 50/12* (2016.01)
*H02J 50/80* (2016.01)
(Continued)

(52) U.S. Cl.
CPC ............ *H02J 50/12* (2016.02); *H02J 7/0027* (2013.01); *H02J 7/0036* (2013.01); *H02J 7/045* (2013.01);
(Continued)

(58) Field of Classification Search
CPC ...................................................... H02J 7/0025
(Continued)

(56) References Cited

U.S. PATENT DOCUMENTS

| 4,654,573 A | 3/1987 | Rough et al. |
| 5,311,973 A | 5/1994 | Tseng et al. |

(Continued)

FOREIGN PATENT DOCUMENTS

| CN | 2461160 | 11/2001 |
| EP | 2 211 438 | 7/2010 |

(Continued)

OTHER PUBLICATIONS

Lemmes et al, WO2009081126, circuitry for inductive power transfer, Jul. 2009.*

(Continued)

*Primary Examiner* — Robert Grant
*Assistant Examiner* — Tynese V McDaniel

(57) ABSTRACT

An inductive wireless power system using an array of coils with the ability to dynamically select which coils are energized. The coil array can determine the position of and provide power to one or more portable electronic devices positioned on the charging surface. The coils in the array may be connected with series resonant capacitors so that regardless of the number of coils selected, the resonance point is generally maintained. The coil array can provide spatial freedom, decrease power delivered to parasitic loads, and increase power transfer efficiency to the portable electronic devices.

27 Claims, 29 Drawing Sheets

Related U.S. Application Data

(60) Provisional application No. 61/167,829, filed on Apr. 8, 2009.

(51) Int. Cl.
*H02J 50/90* (2016.01)
*H02J 50/40* (2016.01)
*H02J 7/00* (2006.01)
*H02J 7/04* (2006.01)

(52) U.S. Cl.
CPC .............. *H02J 50/40* (2016.02); *H02J 50/80* (2016.02); *H02J 50/90* (2016.02)

(58) Field of Classification Search
USPC ........................................................ 320/108
See application file for complete search history.

(56) References Cited

U.S. PATENT DOCUMENTS

| | | | |
|---|---|---|---|
| 5,519,262 A | 5/1996 | Wood | |
| 5,821,728 A | 10/1998 | Schwind | |
| 5,889,384 A | 3/1999 | Hayes et al. | |
| 5,923,544 A | 7/1999 | Urano | |
| 6,212,430 B1 | 4/2001 | Kung | |
| 6,366,817 B1 | 4/2002 | Kung | |
| 6,400,991 B1 | 6/2002 | Kung | |
| 6,459,218 B2 | 10/2002 | Boys et al. | |
| 6,621,183 B1 | 9/2003 | Boys | |
| 6,650,213 B1 | 11/2003 | Sakurai et al. | |
| 6,803,744 B1 | 10/2004 | Sabo | |
| 6,844,702 B2 * | 1/2005 | Giannopoulos | H02J 7/025 320/108 |
| 6,906,495 B2 | 6/2005 | Cheng et al. | |
| 7,076,206 B2 | 7/2006 | Elferich et al. | |
| 7,164,255 B2 | 1/2007 | Hui | |
| 7,212,414 B2 | 5/2007 | Baarman | |
| 7,233,137 B2 | 6/2007 | Nakamura et al. | |
| 7,518,337 B2 | 4/2009 | Beart et al. | |
| 7,521,890 B2 | 4/2009 | Lee et al. | |
| 7,522,878 B2 | 4/2009 | Baarman | |
| 7,576,514 B2 | 8/2009 | Hui | |
| 7,622,891 B2 | 11/2009 | Cheng et al. | |
| 7,639,514 B2 | 12/2009 | Baarman | |
| 7,696,729 B2 * | 4/2010 | Shiue | B60K 6/28 320/166 |
| 7,872,445 B2 | 1/2011 | Hui | |
| 8,159,183 B2 | 4/2012 | Choi et al. | |
| 8,338,990 B2 | 12/2012 | Baarman et al. | |
| 2002/0018025 A1 | 2/2002 | Matsuda et al. | |
| 2004/0130916 A1 | 7/2004 | Baarman | |
| 2005/0007067 A1 | 1/2005 | Baarman et al. | |
| 2005/0068019 A1 | 3/2005 | Nakamura et al. | |
| 2005/0189910 A1 * | 9/2005 | Hui | H01F 17/0006 320/108 |
| 2006/0197493 A1 | 9/2006 | Kim et al. | |
| 2006/0202665 A1 * | 9/2006 | Hsu | H02J 7/025 320/139 |
| 2007/0029965 A1 * | 2/2007 | Hui | H01F 38/14 320/112 |
| 2007/0145830 A1 | 6/2007 | Lee et al. | |
| 2007/0182367 A1 | 8/2007 | Partovi | |
| 2007/0279002 A1 * | 12/2007 | Partovi | H02J 7/0027 320/115 |
| 2008/0067874 A1 | 3/2008 | Tseng | |
| 2008/0278112 A1 | 11/2008 | Hui et al. | |
| 2008/0278122 A1 | 11/2008 | Chi | |
| 2009/0015197 A1 | 1/2009 | Sogabe et al. | |
| 2009/0033280 A1 * | 2/2009 | Choi | H02J 7/025 320/108 |
| 2009/0096413 A1 * | 4/2009 | Partovi | H01F 5/003 320/108 |
| 2009/0108805 A1 * | 4/2009 | Liu | H01F 38/14 320/108 |
| 2009/0230777 A1 | 9/2009 | Baarman et al. | |
| 2009/0322280 A1 * | 12/2009 | Kamijo | H02J 7/025 320/108 |
| 2010/0073177 A1 | 3/2010 | Azancot et al. | |
| 2010/0109443 A1 | 5/2010 | Cook et al. | |
| 2010/0127660 A1 * | 5/2010 | Cook | H01Q 1/248 320/108 |
| 2010/0190435 A1 | 7/2010 | Cook et al. | |
| 2010/0219698 A1 * | 9/2010 | Azancot | H01F 38/14 307/104 |
| 2010/0225271 A1 | 9/2010 | Oyobe et al. | |
| 2010/0259217 A1 | 10/2010 | Baarman et al. | |
| 2010/0328044 A1 | 12/2010 | Waffenschmidt et al. | |
| 2011/0025133 A1 | 2/2011 | Sauerlaender et al. | |
| 2011/0285210 A1 | 11/2011 | Lemmens et al. | |
| 2012/0007437 A1 | 1/2012 | Fells et al. | |

FOREIGN PATENT DOCUMENTS

| | | |
|---|---|---|
| GB | 2 388 716 | 11/2003 |
| GB | 2 389 720 | 12/2003 |
| JP | H11-095922 | 4/1999 |
| JP | 2006-149168 | 6/2006 |
| JP | 2006-246633 | 9/2006 |
| JP | 2009-508331 | 2/2009 |
| JP | 2010-200497 | 9/2010 |
| WO | 95/11544 | 4/1995 |
| WO | 95/11545 | 4/1995 |
| WO | 01/16995 | 3/2001 |
| WO | 03/105308 | 12/2003 |
| WO | 2008/035248 | 3/2008 |
| WO | 2008/137996 | 11/2008 |
| WO | 2009/040807 | 4/2009 |
| WO | 2009/047768 | 4/2009 |
| WO | 2009/081115 | 7/2009 |
| WO | 2009/081126 | 7/2009 |
| WO | 2009/116025 | 9/2009 |
| WO | 2009/147664 | 12/2009 |

OTHER PUBLICATIONS

Merritt, Purcell, Stroink; "Uniform Magnetic Field Produced by Three, Four, and Five Square Coils;" Rev. Sci. Instrum.; Jul. 1983; pp. 879-882; vol. 54 No. 7.
Achterberg, Lomonova, De Boeij; "Coil Array Structures Compared for Contactless Battery Charging Platform;" IEEE Transactions on Magnetics; May 2008; pp. 617-622; vol. 44, No. 5.
Hui, Ho; "A New Generation of Universal Contactless Battery Charging Platform for Portable Consumer Electronic Equipment;" 35th Annual IEEE Power Electronics Specialists Conference; 2004; pp. 638-644.
Sasada; "Three-Coil System for Producing Uniform Magnetic Fields;" Journal of the Magnetics Sociiety of Japan; 2002; Abstract; vol. 27 No. 4.
Hatanaka, Sato, Matsuki, Kikuchi, Murakami, Kawase, Satoh; "Excited Composition of Primary Side in Position-Free Contactless Power Station System;" 2002; pp. 580-584; vol. 26 No. 4.
Matsuki, Kikuchi, Murakami, Satoh, Hatanaka, Sato; "Power Transmission of a Desk With a Cord-Free Power Supply;" IEEE Transactions on Magnetics; Sep. 2002; pp. 3329-3331; vol. 38 No. 5.
Marder; "The Physics of SERAPHIM;" Sandia National Laboratories; Oct. 2001.
Hatanaka, Sato, Matsuki, Kikuchi, Murakami, Satoh; "Coil Shape in a Desk-Type Contactless Power Station System;" Jan. 24, 2001; pp. 1015-1018; vol. 25 No. 4-2.
Sato, Adachi, Matsuki, Kikuchi; "The Optimum Design of Open Magnetic Circuit Meander Coil for Contactless Power Station System;" Digest of INTERMAG 99; May 1999; pp. GR09-GR09.
Tang, Hui, Chung; "Characterization of Coreless Printed Circuit Board (PCB) Transformers;" 1999; pp. 746-752.
Pedder, Brown, Skinner; "A Contactless Electrical Energy Transmission System;" IEEE Transactions on Industrial Electronics; Feb. 1999; pp. 23-30; vol. 46 No. 1.
Sato, Murakami, Suzuki, Matsuki, Kikuchi, Harakawa, Osada, Seki; "Contactless Energy Transmission to Mobile Loads by CLPS-Test

(56) References Cited

OTHER PUBLICATIONS

Driving of an EV with Starter Batteries;" Sep. 1997; pp. 4203-4205; vol. 33 No. 5.
Murakami, Sato, Watanabe, Matsuki, Kikuchi, Harakawa, Satoh; "Consideration on Cordless Power Station-Contactless Power Transmission System;" IEEE Transactions on Magnetics; Sep. 1996; pp. 5037-5039; vol. 32 No. 5.
Sato, Murakami, Matsuki, Kikuchi, Harakawa, Satoh; "Stable Energy Transmission to Moving Loads Utilizing New CLPS;" IEEE Transactions on Magnetics; Sep. 1996; pp. 5034-5036; vol. 32 No. 5.
Donig, Melbert, Scheckel, Schon; "An Interface Circuit for Contactless Power and Data Transmission for Chipcard and Identification Systems;" Solid-State Circuits Conference, 1991; Sep. 1991; pp. 61-64; vol. 1.
Abel, Third; "Contactless Power Transfer—An Exercise in Topology;" IEEE Transactions on Magnetics; Sep. 1984; pp. 1813-1815; vol. 20 Issue 5.
Carter; "Coil-System Design for Production of Uniform Magnetic Fields;" Proceedings of the Institution of Electrical Engineers; Nov. 1976; pp. 1279-1283; vol. 123 No. 11.
Written Opinion of the International Searching Authority, International Application No. PCT/US2010/030320, International Filing Date Aug. 4, 2010.

* cited by examiner

|       | Zone 1 L1, L4, L6 | Zone 2 L3, L4, L6 | Zone 3 L3, L4, L7 | Zone 4 L2, L4, L7 | Zone 5 L2, L4, L5 | Zone 6 L1, L4, L5 |
|-------|-------------------|-------------------|-------------------|-------------------|-------------------|-------------------|
| SW1   | ON                |                   |                   |                   |                   | ON                |
| SW2   | ON                |                   |                   |                   |                   | ON                |
| SW3   |                   |                   |                   | ON                | ON                |                   |
| SW4   |                   |                   |                   | ON                | ON                |                   |
| SW5   |                   | ON                | ON                |                   |                   |                   |
| SW6   |                   | ON                | ON                |                   |                   |                   |
| SW7   |                   |                   |                   |                   | ON                | ON                |
| SW8   |                   |                   |                   |                   | ON                | ON                |
| SW9   | ON                | ON                |                   |                   |                   |                   |
| SW10  | ON                | ON                |                   |                   |                   |                   |
| SW11  |                   |                   | ON                | ON                |                   |                   |
| SW112 |                   |                   | ON                | ON                |                   |                   |

Fig. 9B

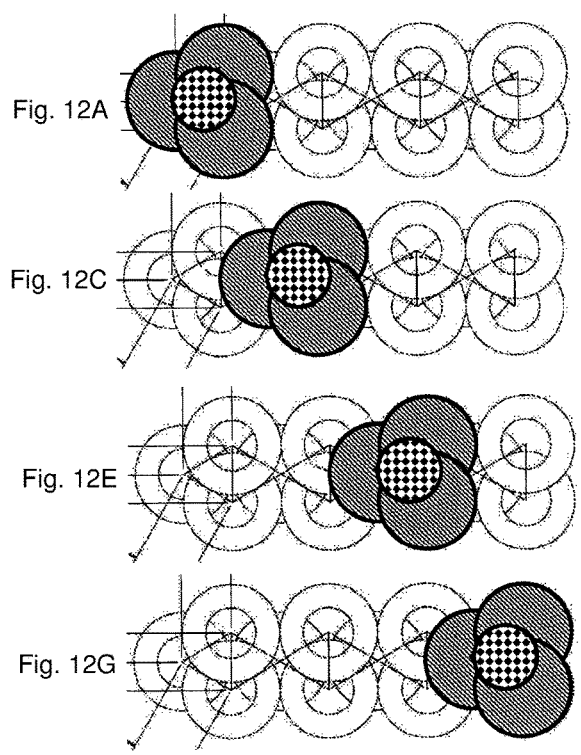
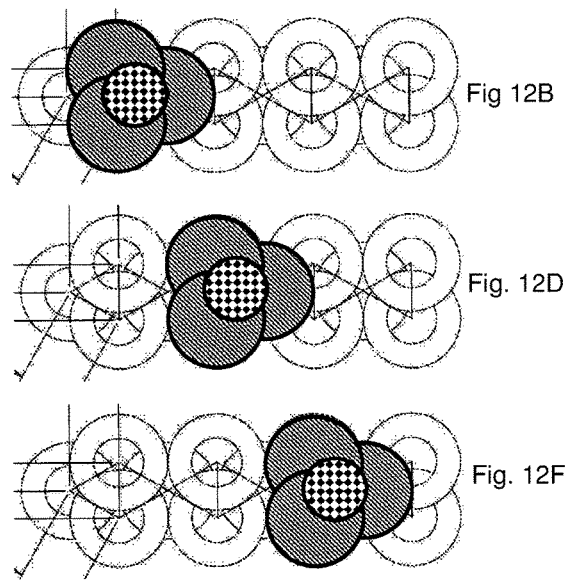
Fig. 12A
Fig. 12C
Fig. 12E
Fig. 12G
Fig 12B
Fig. 12D
Fig. 12F

SELECTABLE COIL ARRAY

FIELD OF THE INVENTION

The present disclosure relates to wireless power and wireless charging.

BACKGROUND OF THE INVENTION

An inductive power supply may be used to supply wireless power to power or charge secondary devices. In some known inductive power supplies, secondary devices are powered or charged by placing them on a charging surface. Many inductive power supplies limit spatial freedom by requiring specific placement and orientation of the remote device with respect to the inductive power supply.

In some known inductive power supply systems, a single primary coil 102 is embedded in a charging surface 104 of a charging device 106 and a single secondary coil 108 is embedded in a secondary device 110. For example, in the prior art inductive power supply system shown in FIGS. 1 and 2 one secondary coil 108 is embedded in the secondary device 110 and is aligned in close proximity to the primary coil 102 embedded in the charging device 106. Power is provided from a mains input to the charging device 106, sometimes referred to as a wireless power supply. Assuming the mains input provides AC power, the power can be rectified in a mains rectification circuit 202 into DC power and then can be adjusted in a DC/DC power supply 204. An inverter 206 can switches the DC power at a frequency controlled by the controller 208 in order to generate an AC signal across the inductive tank circuit 210 to produce an electromagnetic field. The tank circuit in most conventional inductive power supplies includes a primary coil 102 and a primary capacitor 213 The secondary device 110 includes a secondary coil 108 and an optional resonant capacitor 214 to receive the electromagnetic energy. The AC signal can be rectified into DC power in a rectification circuit 216. From there, the DC power can directly power the load 220, or where the load is a battery the power can be used to charge the battery. A controller 218 may be utilized to control how the power is applied to the load or to control a charging algorithm for charging a battery. In this type of system, power transfer efficiency is typically increased when the coils are aligned center to center, and when the spacing between the primary and secondary coils is reduced. However, this requirement of close one-to-one alignment in order to effectively communicate and transmit power restricts spatial freedom and limits the charger to operation with one secondary device at a time. To enable a surface with wireless power, the user is typically provided with information about where the device needs to be located. This is usually done with a magnetic alignment feature, or with different mechanical guides that force devices to be placed in a certain place, or with graphical elements that guide the user to correctly place the device. Some users would like more freedom to move the secondary device around on the surface of the charging device.

Some solutions to this problem have been proposed. For example, U.S. patent application Ser. No. 12/652,077 to Baarman et al., filed on Jan. 5, 2010 discloses an inductive power supply with a movable coil and is herein incorporated by reference in its entirety. The movable coil is one mechanical solution to achieve the desired spatial freedom over the surface of the charger while maintaining close coil proximity. The moving coil solution can increase spatial freedom but can introduce the risk of potential mechanical reliability problems.

Another proposed solution is to utilize a large primary coil so that energy can be provided over a greater area. This solution can be problematic because a larger coil may create undesired stray magnetic fields and it can be difficult to transfer power efficiently.

Yet another proposed solution is to provide an array of coils arranged adjacently in a single layer. In this solution, a number of primary coils are disposed in an array near the charging surface. When a device is placed on the charging surface that is greater in size than the device, energy is only transferred from that part of the planar charging surface that is directly beneath the device, and possibly immediately adjacent areas that are able to couple to the secondary coil. That is, in one configuration, all of the coils of the array of primary coils are driven simultaneously to create magnetic flux that is substantially uniform over the charging surface so that the precise position and orientation of the electronic device on the charging surface is not critical. In addition, parasitic loads, such as pieces of metal or non-wirelessly powered devices, can absorb the magnetic field and lower the system efficiency.

Some solutions propose a multi-layer coil array in order to provide a more uniform magnetic field distribution. One problem with a single layer array of coils is that where there are gaps between the coils, the magnetic field is lower, which is sometimes referred to as a valley. By having two or more layers of coils arranged such that the center of a winding pattern on one layer is placed on the gap between adjacent winding patterns on the other layer, a more uniform field distribution can be achieved. Energizing all those coils simultaneously can lead to hot zones and dead zones due to field construction and field deconstruction effects that occur from overlapping fields. In addition, parasitic loads, such as pieces of metal or non-wirelessly powered devices, can absorb the magnetic field and lower the system efficiency.

Some array solutions attempt to circumvent having to turn on a large amount of coils by providing magnetic attractors to specifically locate the device on a charging surface so that power can be transferred utilizing a single coil. However, magnetic attractors add cost, complexity, and can lower efficiency of the power transfer system. Various ergonomic alignment solutions have also been proposed, but these aids can disrupt the aesthetics of surfaces, add complexity to the design of the surface, and can affect the usability because alignment still may not be guaranteed.

SUMMARY OF THE INVENTION

The present invention provides a coil array system that includes an array of coils that can be selectively energized to provide power to one or more devices on a charging surface. Due to the selectable nature of the coil array, different combinations of coils can be energized to intelligently shift the location of the magnetic field on the charging surface.

In one embodiment, a coil array system is provided that includes overlapping coils where different coils can be turned on or off. This makes it possible to provide power at any point on the surface, thus giving spatial freedom across the surface, while giving the primary control over which areas are provided power. This can decrease losses due to parasitic loads, as well as increase efficiency by providing better coupling between the primary and secondary coils.

In one embodiment, the coils are stacked and spread out over multiple layers and the system has the capability of individually and selectively energizing each coil in the coil array. The coil selection can be at least partially based on the position of the secondary coil on the charging surface. Depending on which and how many coils are energized, the location of the magnetic field can be shifted to a variety of positions on the charging surface. By determining where the secondary coil is positioned on the charging surface, a controller can be programmed to selectively energize coils that ensure that the magnetic field is stronger where the secondary coil is positioned.

In another embodiment, each coil in the coil array is connected to a separate series resonant capacitor. Each capacitor, in conjunction with the coil it is connected to, forms a tank circuit with a particular resonant frequency. When multiple tank circuits are connected in parallel, the resonant frequency of the system is generally maintained as each additional tank circuit is added to the system. This facilitates efficient power transfer to the secondary coil independent of the number of coils selected to be energized because wireless power transfer efficiency is generally increased where the primary coil resonant frequency and the secondary coil resonant frequency are similar.

In another embodiment, a method for detecting the location of a secondary coil on the charging surface of a coil array system is known. The method includes pinging a plurality of coils, measuring the response to the ping of each coil, and comparing the measurements to determine the position of the secondary coil with respect to the position of the coil array.

These and other features of the invention will be more fully understood and appreciated by reference to the description of the embodiments and the drawings.

BRIEF DESCRIPTION OF THE DRAWINGS

FIG. 9B shows a table of switch states for energizing six zones in the seven coil, three layer, coil array.

FIGS. 12A-G shows how the zones from FIG. 11 can be activated by energizing three coils at a time.

DESCRIPTION OF THE CURRENT EMBODIMENT

Figure 8A:
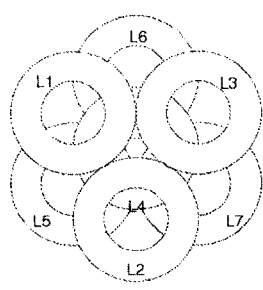
FIGS. 8A-H show an arrangement of coils that provides six potential zones that can be energized to provide power when selecting three coils at a time.
Figure 11:
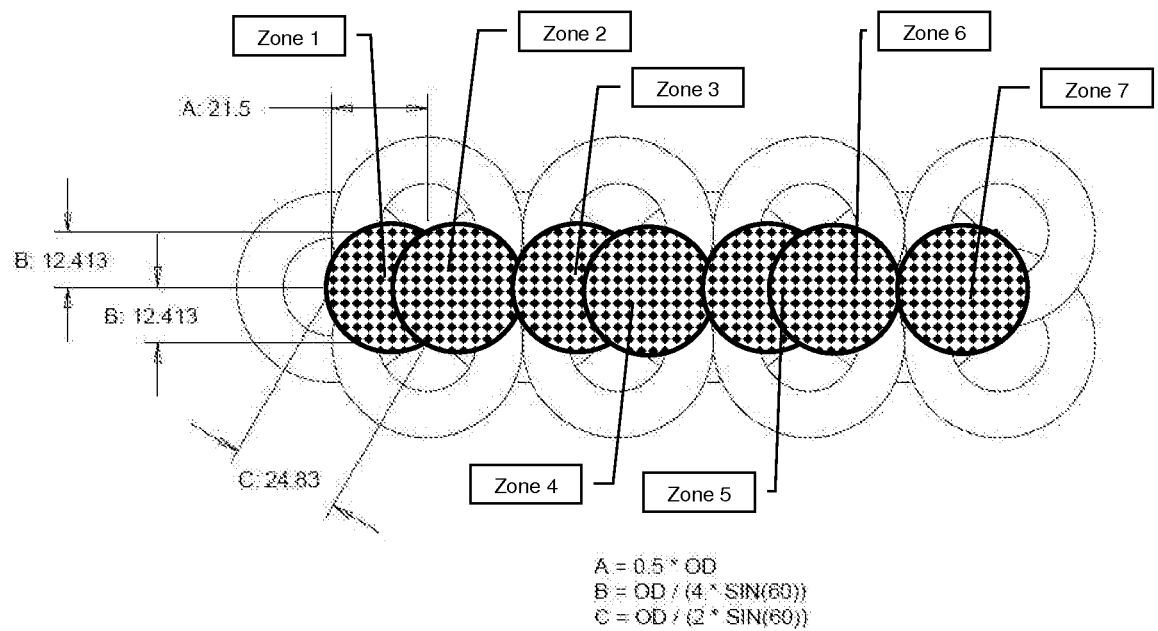
FIG. 11 shows an arrangement of coils that provides seven potential zones that can be energized to provide power when selecting three coils at a time.

A multi-layer coil array system in accordance with an embodiment of the present invention is shown in FIGS. 8A. Other multi-layer coil array systems in accordance with additional embodiments of the present invention are shown in FIG. 11 (line multi-layer coil array) and FIG. 15 (rectangular multi-layer coil array). The multi-layer coil array system provides a charging surface where one or more remote devices can be placed in order to receive wireless power. In each of the current embodiments, the multi-layer coil array system includes an inductive power supply, a multi-layer coil array, and a controller programmed to selectively energize one or more coils within the multi-layer coil array in order to transfer power wirelessly to a device placed on the charging surface.

Figure 1:
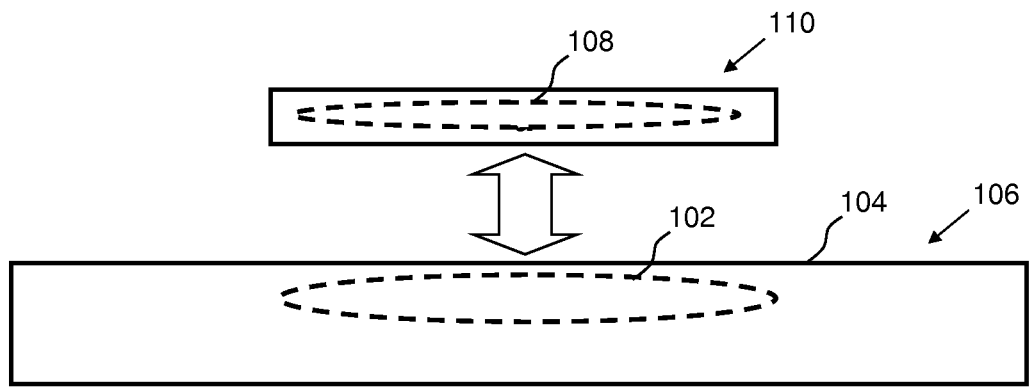
FIG. 1 shows a representative view of a prior art inductive power supply system.
Figure 2:
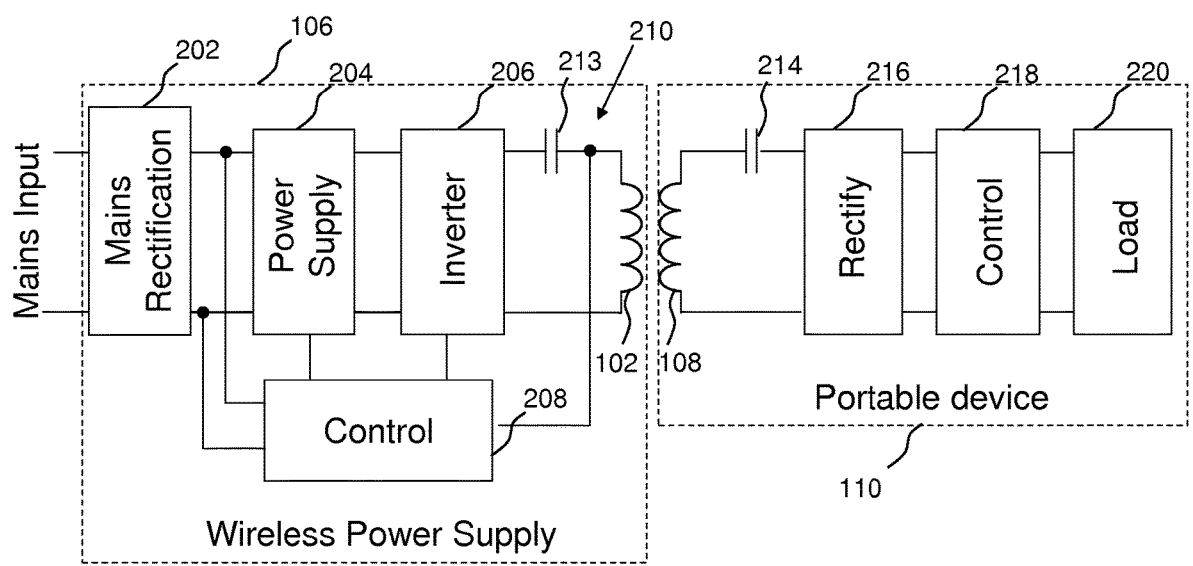
FIG. 2 shows a circuit diagram of a prior art inductive power supply.
Figure 3A:
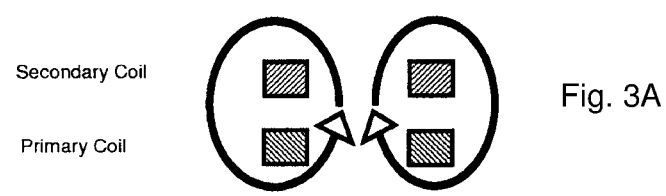
FIGS. 3A-C show the flux path of a single coil transmitter and a multiple coil transmitter with varying secondary alignments.
Figure 3B:
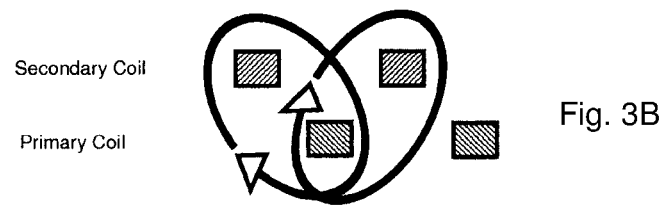
Figure 3C:
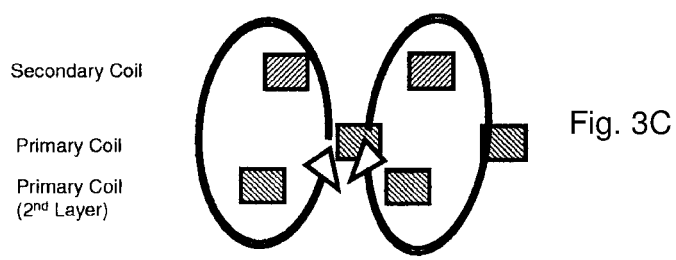

FIG. 3A-C illustrates a cross sectional representation of an inductive power system and shows the effects of field cancellation with secondary misalignment. FIG. 3A illustrates how magnetic flux flows around coils transferring power in a conventional inductive power system. FIG. 3B illustrated that when the secondary coil is misaligned in a conventional system, flux from the primary coil can cancel the current on either half of the secondary coil, inhibiting power transfer. FIG. 3C shows that by having multiple primary coils offset at a distance equal to a single coil radius, field cancellation can be avoided under some circumstances.

Figure 4:
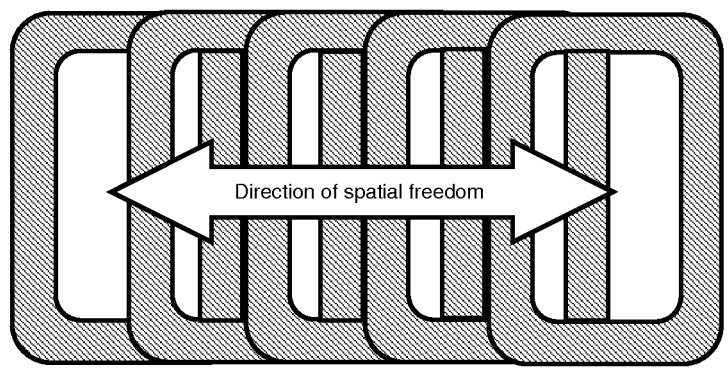
FIG. 4 shows a primary coil array that provides spatial freedom in a single direction by using overlapping coils.
Figure 5:
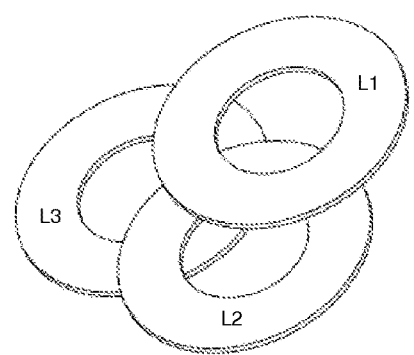
FIG. 5 shows one embodiment of a basic building block of a coil array.
Figure 5:
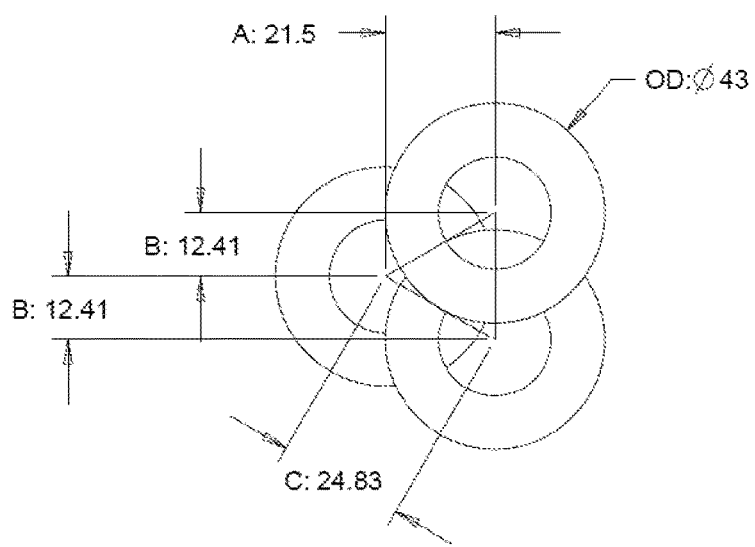

Perhaps as best shown in FIG. 4, by layering multiple coils and having the ability to select which coils to energize, a secondary device can be given spatial freedom across a surface. In the depicted embodiment, each coil is successively layered on top of the next. In alternative embodiments, the coils could have a different configuration, for example the coils could be spread across two staggered layers instead of each on a separate layer. As a remote device with a secondary coil is slid across the surface, a different coil can be energized to ensure that the coil to which the secondary coil is most closely aligned is the coil that is energized. In the FIG. 4 embodiment, the coils are layered along a single axis and provide spatial freedom in one direction. In alternative embodiments, the coils could also be layered in other axes so as to provide spatial freedom in additional directions. FIG. 5 shows a three layer array where each coil is offset from one another by one radius, effectively providing the spatial freedom of FIG. 4 in multiple directions.

Position information regarding the secondary device can be communicated to or determined by the system in a variety of ways. For example, a sensor could be used to sense the tank circuit current, mains input current, rectified mains input current in order to measure reflected impedance and discern position information. Other examples include measuring secondary side voltage, secondary side current, or communication depth, and then communicating the measurement to the inductive power supply. In the current embodiment a measure of voltage on the secondary is sent as data back to the primary so that the position can be determined.

In one embodiment, the controller is programmed to have the inductive power supply energize a coil for a short period of time and can determine whether an object is present and how close the object is located to the energized coil. By repeating this process with each coil, or a subset of coils, in the coil array, and comparing the relative results, the position of a secondary device on the charging surface can be determined. This process may also include a verification step to confirm that the detected object is a remote device desirous of receiving wireless power.

Figure 10A:
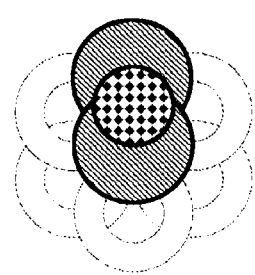
FIGS. 10A-F shows an embodiment where combinations of one, two, or three coils can be energized to provide power wirelessly to a secondary device.
Figure 10B:
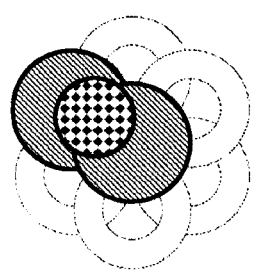
Figure 10C:
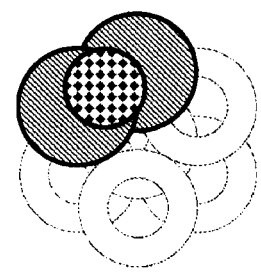
Figure 10D:
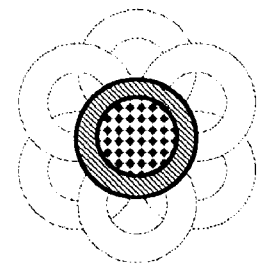

In one embodiment, when a coil is energized, the reflected impedance from the secondary load can be sensed using a sensor on the primary side. For example, a current sensor in the primary tank circuit will show that the current changes as a function of whether or not a secondary coil is present and the distance of the secondary coil from the primary coil. This process can be referred to as pinging. When the data is collected from pinging multiple coils it can be utilized in conjunction with other data regarding the secondary device in order to determine position information about the secondary coil. By way of example, in the seven coil array system if a secondary coil is placed in the position shown in FIG. 10A, each coil L1-L7 in the array can be pinged and the responses to the ping can be stored in memory. Given the position of the secondary device in FIG. 10A, the response to the ping for coils L1 and L3 will be relatively similar and the response to the ping for coils L4 and L6 will be relatively similar because the secondary device in FIG. 10A is placed approximately equal distance between L1 and L3 and approximately equal distant from L4 and L6. There can be some differences in the ping response due to the coil layer, but that can be accounted for in the process. The response to the ping for L5, L2, and L7 will be relatively less because the secondary device is positioned farther away. In this simple scenario, the system can determine that the secondary coil is placed equidistant between coils L1 and L3 and equidistant between coils L4 and L6. Utilizing this position information and cross-referencing the position information against the known power zones that can be created, a particular power zone suitable for that position can be chosen. In this particular situation, turning on coils L4 and L6 provides the zone of power at the most favourable position.

Figure 10E:
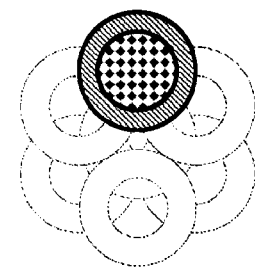
Figure 10F:
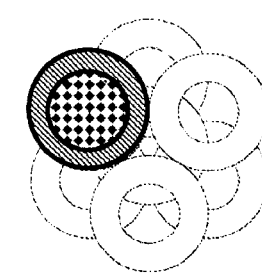

By way of another example, for the position of the secondary coil shown in FIG. 10E, the ping response may be highest for coil L6, while the response to coils L1 and L3 are relatively similar. Utilizing this information the system can recognize that the secondary coil is closely aligned with the L6 primary coil and therefore the system can decide to just activate the L6 coil alone.

The two previous examples show how the system works where there is some symmetry in the ping responses between because the secondary device was placed equidistant between some of the coils. The system also works when the secondary device is not placed in a position where it would perfectly align with one of the zones that can be created. Utilizing triangulation techniques and the relative ping responses of the coils, the system can determine which zone is best suited to provide power. For example, a secondary device placed in-between three primary coils may not be coupled equally to each coil. By using a threshold value, the primary may determine that each of the coils is close enough to efficiently provide power, as in FIG. 8C, or it may be determined that only two coils are needed, as in FIG. 10A.

In the current embodiment, pinging utilizes a current sensor on the primary side. In alternative embodiments, the pinging response can be recorded utilizing any circuitry capable of measuring how much energy was received by the secondary coil. For example a voltage sensor on the primary side, or a current or voltage sensor on the secondary side in conjunction with a communication path with the primary side, such as a IR, Bluetooth or any other communication technique may be utilized.

Other factors besides positioning can also be taken into account during this process. For example, if the remote device connected to the secondary coil requires more power than two primary coils could provide, then additional primary coils may be utilized to increase the total amount of power delivered to the load. Or, if there is a parasitic load, such as a piece of metal located on the charging surface, the controller may identify the parasitic load and then choose to activate coils farther away from the parasitic load, but still able to provide power to the secondary device. These are just two examples of other information that can be factored into the decision about which coils to activate in the selectable coil array.

The system can utilize position information to determine which coils and how many coils to energize in order to transfer power to the secondary device. By turning on different combination of coils, the position of the magnetic field can be shifted around the charging surface. In general, it is typically desirable to align a peak in the magnetic field with the position of the secondary coil in the remote device.

In some embodiments, a predetermined number of coils can be energized depending on the position of the secondary device. In other embodiments, the number of coils to be energized can be dynamic and can change depending on the position of the secondary device or on a variety of other factors. In one embodiment of a coil array system, three coils can be selected and energized simultaneously in parallel.

The parallel coils then share an impedance matching network, which generates a resonant system, wherein the voltage across each coil is the same. As coupling changes between the three coils, typically due to the position of the secondary device shifting, the power transfer efficiency is reduced. The power transfer efficiency can be assisted by dynamically controlling which coils are energized based on the position of the secondary coil. For example, where a secondary coil is aligned directly over a single coil, power transfer should be performed utilizing that single, aligned coiled, if possible. In this circumstance if power transfer is performed by energizing three coils in parallel, such as those depicted in FIG. 5, power transfer can be disrupted to the point where the system may no longer function. Put another way, the efficiency may be reduced by field cancellation at that location, as well as power can be wasted in the other coils given their poor coupling to the secondary.

Figures 6A, 6B:
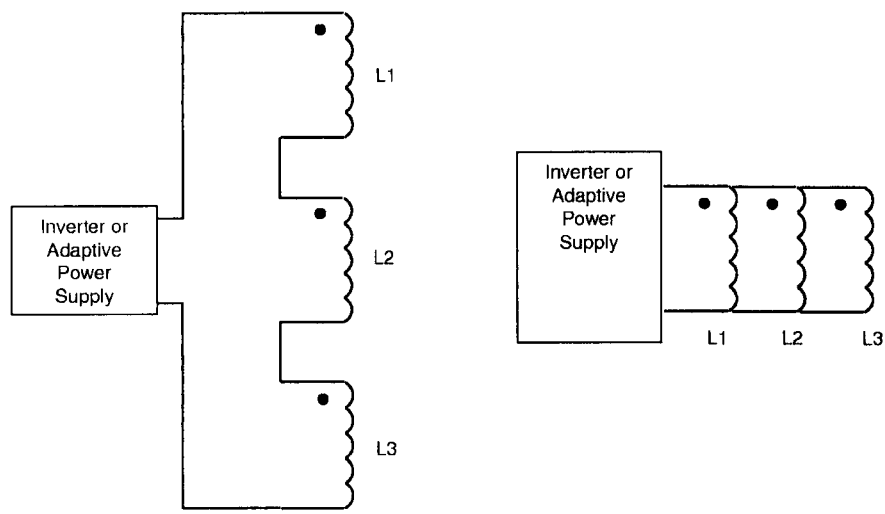
FIGS. 6A-B show some wiring options for the basic building block of the array.
Figure 7:
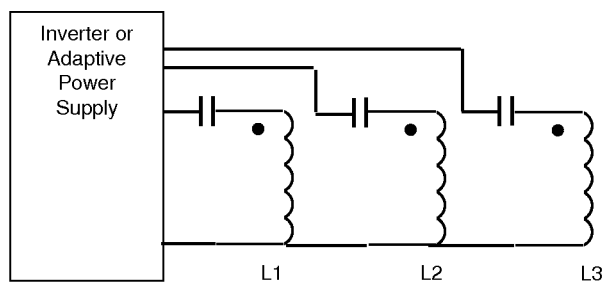
FIG. 7 shows a three coil array in which each primary coil has its own series resonant capacitor.

The coils can be wired in parallel or series, with or without a series resonant capacitor, and can be controlled by a single controller with multiple outputs or by multiple controllers. For simplicity the wiring arrangement has not been shown in the drawings illustrating the various coil configurations. Instead, a number of separate circuit diagrams illustrate a number of the different coil array configurations. A single building block coil with three coils wired in series is shown in FIG. 6A and a single building block coil wired in parallel is shown in FIG. 6B. No resonant capacitor is shown in these drawings. The capacitor may be included elsewhere in the inductive power supply or in some embodiments may not be included at all. FIG. 7 illustrates a building block coil where each coil includes a separate resonant capacitor.

Figure 20:
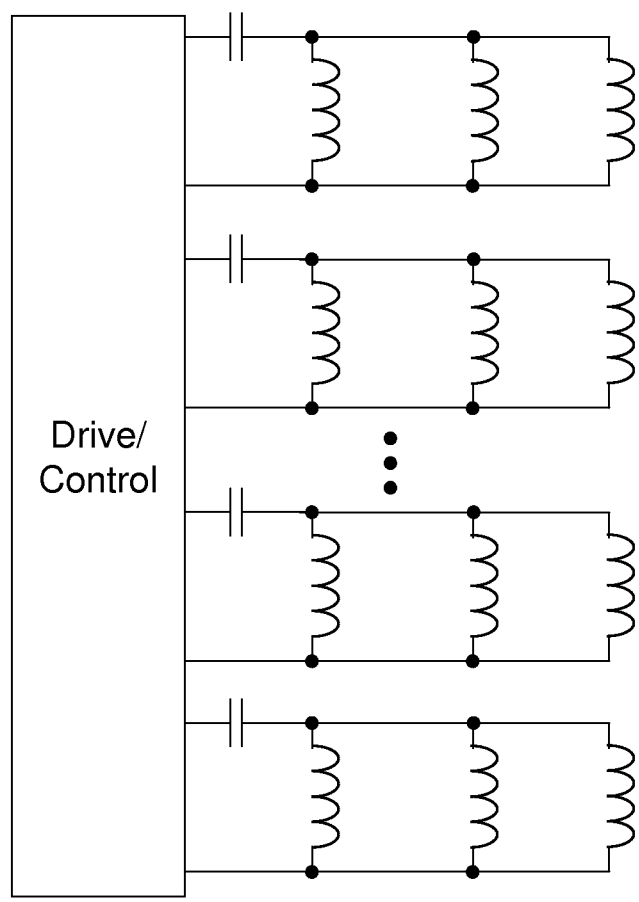
FIG. 20 shows one embodiment of a wiring diagram for a coil array with multiple three-coil building blocks.

The FIG. 20 circuit diagram depicts a multi-layer coil array system where groups of three coils are connected in parallel with a single resonant capacitor to a drive/control circuit. The FIG. 21 circuit diagram depicts a multi-layer coil array system where groups of three coils are connected in series with a single resonant capacitor to a drive/control circuit. In these embodiments, turning on more than one grouping of coils can change the resonance point. The FIG. 22 circuit diagram depicts a multi-layer coil array configuration where each coil is connected in series with a separate resonant capacitor to a drive/control circuit. Different embodiments of the system can utilize different circuit configurations.

Figure 28:
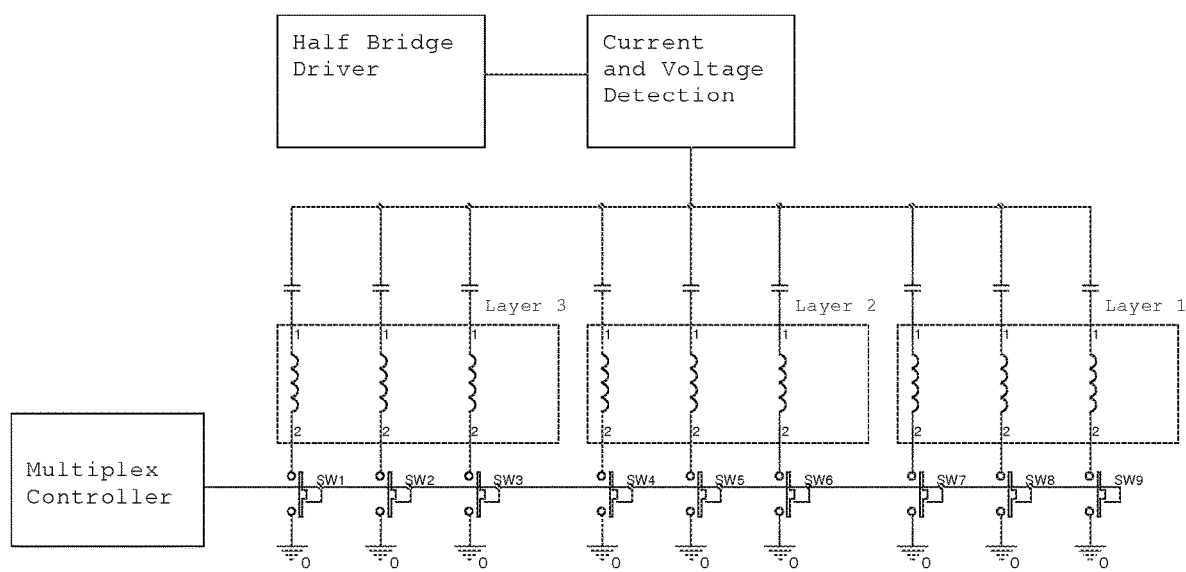
FIG. 28 shows a circuit diagram of a coil array where each coil is individually selectable.

Another embodiment of a multi-layer coil array configuration is illustrated in FIG. 28. In this embodiment, the system includes a half bridge driver, a current and voltage detection circuit, a nine coil, three-layer array, and a multiplex controller that can individually select any combination of the nine coils to be included in the circuit utilizing switches SW1-SW9. In this embodiment, unlike the FIG. 6, FIG. 7, FIG. 20, and FIG. 21 embodiments, the driver circuitry can individually energize the coils. The ability to individually select any combination of coils provides the ability to reduce dead zones relative to the embodiments where groups of fixed number of coils are energized. Although the FIG. 28 embodiment is illustrated with a half bridge driver, current and voltage detection circuitry, and a multiplex controller, other embodiment could include different versions of these components or could include different components altogether. For example, the circuit could include a full bridge driver or it could include a microcontroller for controlling both the half bridge driver and the switches. The individually selectable multi-coil array can be configured to work with generally any inductive power supply circuit.

Figure 21:
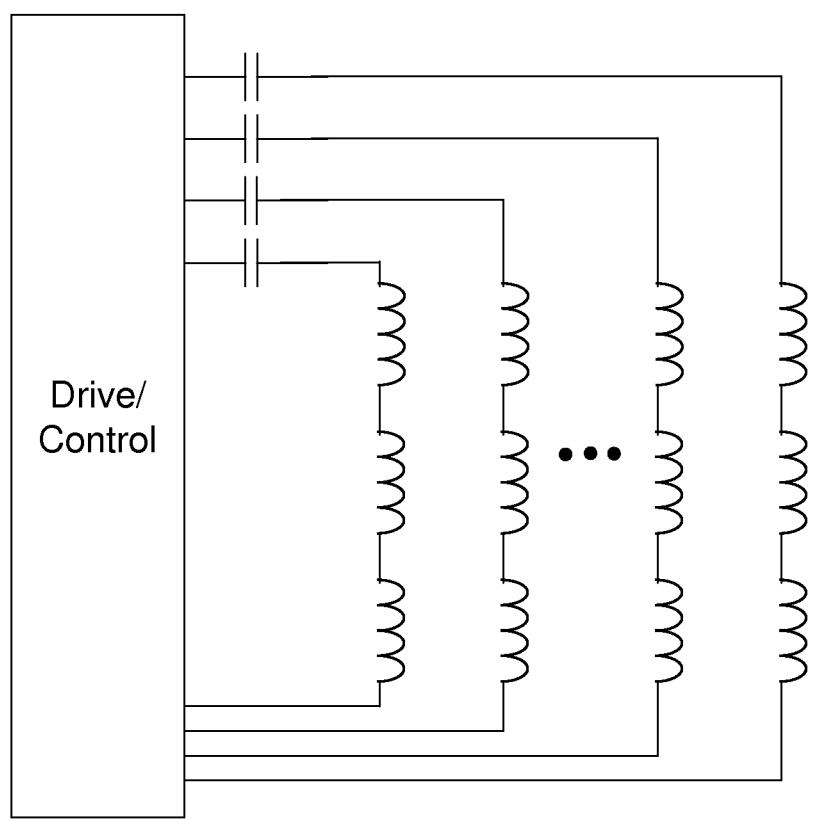
FIG. 21 shows another embodiment of a wiring diagram for a coil array with multiple three-coil building blocks.
Figure 22:
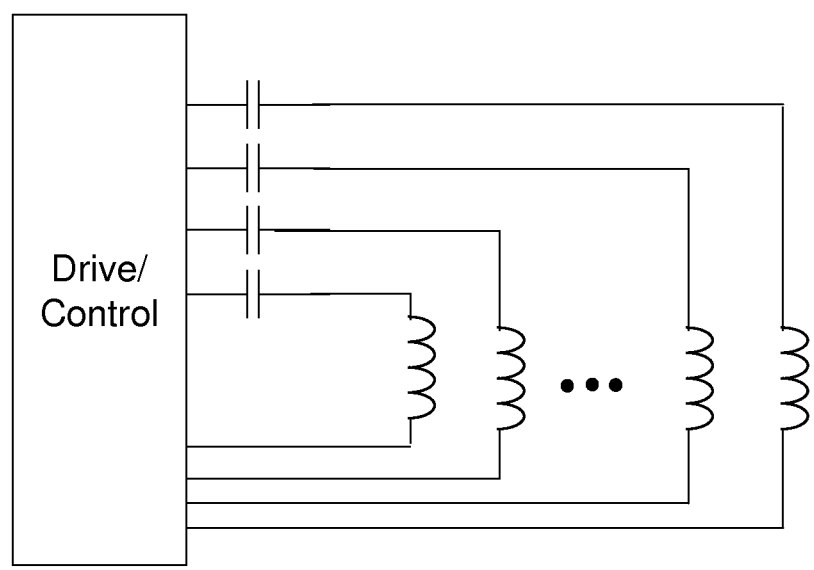
FIG. 22 shows an embodiment of a wiring diagram for a multiple coil array where each coil can be individually selected and includes a series resonant capacitor.

In FIGS. 20 and 21, each set of three coils can be switched in or out of the circuit by the drive/control circuitry. That is, the drive/control circuit can provide AC power to one or more sets of three coils simultaneously. In FIG. 22, each individual coil can be switched in or out of the circuit by the drive/control circuitry individually. That is, the drive/control circuitry can provide power to the entire coil array, to a single coil within the ray, or simultaneously to any combination of coils in the array. The switches are not illustrated in FIGS. 20-22, however it should be understood that essentially any type of switching element or elements can be utilized to switch in and out the coils or groups of coils. For example, field effect transistors could be utilized as switches as shown in the FIG. 9A embodiment. In alternative embodiments different types of switches can be utilized. The drive/control circuit can include a half bridge or a full-bridge inverter and can be resonant or non-resonant.

The coil configurations in FIG. 7, FIG. 22, and FIG. 28, which have a separate resonant capacitor for each coil provide a number of advantages. For example, having a series resonant capacitor for each coil 1) allows any number of coils to be selected while maintaining the same resonance point, 2) allows each coil to be resonant at the same frequency even though the inductance may change with each layer, 3) allows the current to balance to the coil that has the best coupling with the secondary. In some embodiments, some coils are connected with a series resonant capacitor and some coils are not.

Resonant frequency changes as a function of inductance and capacitance, so in embodiments where additional coils and therefore inductance are activated then the resonant point changes. However, where a separate series resonant capacitor is provided, activating additional inductors will not change the resonant point, assuming the series resonant capacitor is appropriate.

The inductance of each coil may be different depending on the distance between the coil and the shielding, or for other reasons. Put another way, the inductance of the top coils may be 7uH, and the bottom coils may be 9uH. In order to maintain the same resonance point for the coils in both positions, the series resonant capacitors may be different. Without a series resonant capacitor it can be difficult and in some cases it may not be possible to maintain the resonant point.

In addition, the current will balance to the coil and capacitor that have the best coupling with the secondary. In general, current balancing has to do with the voltage across the best coupled coil increasing without increasing the voltage across other, less coupled coils.

Where each coil is individually selectable, it is possible for the system to include 1) faster device searching, 2) adjust the number of coils based off of power needs of the secondary, and 3) adjust the number of coils based off of device or coil geometry; and 4) increased ability to provide an inductive field over a more uniform surface.

Faster device searching can be achieved because the system is capable of pinging an entire array of coils or large groups of coils, rather than a fixed small number of coils at once. For example, having each coil or combination of coils be selectable, allows a divide and conquer pinging method whereby an entire surface can be pinged to determine if a device is present and then the area of ping can be recursively reduced until the position of the device can be discerned.

In one embodiment, a multi-layer coil array can be created utilizing a coil building block. As shown in FIG. 5, multiple coils L1, L2, L3 can be arranged in stacked layers and offset to form a coil building block. Sometimes the coils in the coil building block are referred to as spread coils and the coil building block is referred to as a spread coil building block because each coil on a different layer is spread out from the coils on the other layers.

The coil building block illustrated in FIG. 5 is arranged in three stacked layers. The coils can be spaced to achieve overlap and at the same time give the ability to overlap with other adjacent coils. In the current embodiment, the position of each coil in the coil building block is determined by the following formula: where OD=coil outside diameter.

$$A=0.5*OD$$

$$B=OD/(4*SIN(60))$$

$$C=OD/(2*SIN(60))$$

The dimensions A, B, and C are provided to aid the location of the center-points of the coils in a Cartesian coordinate system.

This formula provides geometric spacing for any given coil diameter in the current embodiment. In alternative embodiments, the position of the coils relative to each other may be determined by a different formula or by other criteria. Exemplary dimensions are provided for the relative distances between the coils, of course these dimensions are provided for example only. Arrays of non-uniform coil sizes and/or shapes may be employed. They may use a different formula or set of formulas to locate the coils in a coordinate system.

A single coil building block can form a multi-layer array or multiple building blocks can be positioned adjacent to each other to form a larger array. Spatial freedom can be achieved in all directions using a three layer array with spiral coils.

The coil building block illustrated in FIG. 5 includes three stacked coils. In alternative embodiments additional or fewer coils may be used to form a coil building block. In the current embodiment, each of the three coils in the building block is identical. In alternative embodiments, the coils that make up a coil building block may vary in geometry, dimension, number of winding turns, or in other ways. Although the present invention is described within the context of coil building blocks to simplify the description of a larger multi-layer array of coils, it should be understood that the multi-layer arrays described herein may be constructed by arranging individual coils or by arranging coil building blocks.

Multiple coil building blocks can be arranged to form a coil array. For example, a line coil array can be formed by placing the coil building blocks in a line as shown in FIG. 11. Another example is the rectangular coil array illustrated in FIG. 15, which is formed by placing coil building blocks in a rectangular pattern. The shape and size of the array can vary depending on the desired application as a function of the number and arrangement of coil building blocks.

In the current embodiment, each coil is horizontally offset by one radius length of the coil and arranged in a stacked configuration directly on top of one another. The coils are shown as generic donut shapes in the illustrations, which represent generally spiral coils. However, it should be understood that the coil geometry, number of turns of the winding, wire diameter and essentially any other physical property of the coil may vary depending on the application.

FIGS. 6A-B show two different possible circuit configurations for the coils. FIG. 6A illustrates L1, L2, and L3 connected in series. FIG. 6B illustrates coils L1, L2, and L3 connected in parallel.

FIG. 7 shows another embodiment of a coil array building block where each coil includes a series resonant capacitor. In this embodiment, each coil is individually selectable. This allows any one, any two, or all three coils to be energized simultaneously.

Figure 8B:
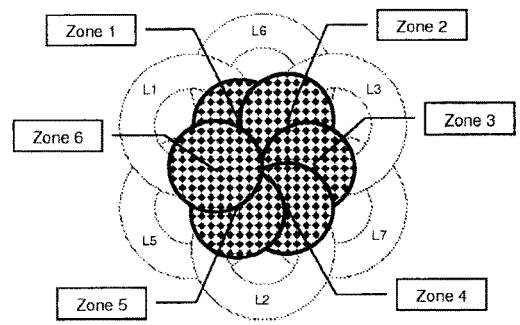
Figure 8C:
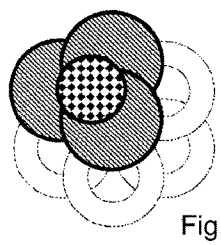
Figure 8H:
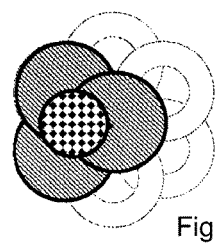
Figure 8G:
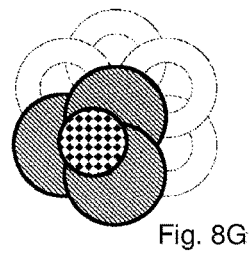
Figure 8D:
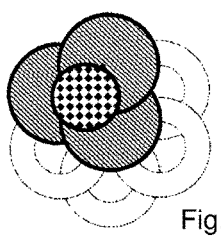
Figure 8E:
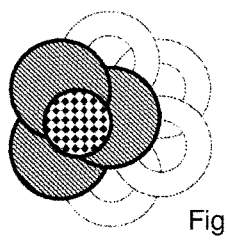
Figure 8F:
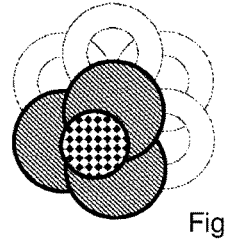

FIG. 8A illustrates one embodiment of a seven coil, three layer, selectable coil circuit. In this embodiment the individual coils are selected by the switches SW1 through SW12 shown in FIG. 9 in order to form an energized zone in the pattern of the basic three coil module. Six zones that can be selected by energizing three coils are illustrated in FIG. 8B. The coils may be energized in series or in parallel.

The six illustrated zones also represent various locations where a secondary coil could be positioned to receive wireless power. Further, the coils with the diagonally filled pattern represent which coils should be energized in order to appropriately provide power for a secondary device positioned in a particular zone. The secondary device is shown in a diamond fill pattern. A representative circuit diagram, which shows how an inductive power supply may connect to the various coils in the multi-layer seven coil array in the current embodiment is depicted in FIG. 9A.

Figure 9A:
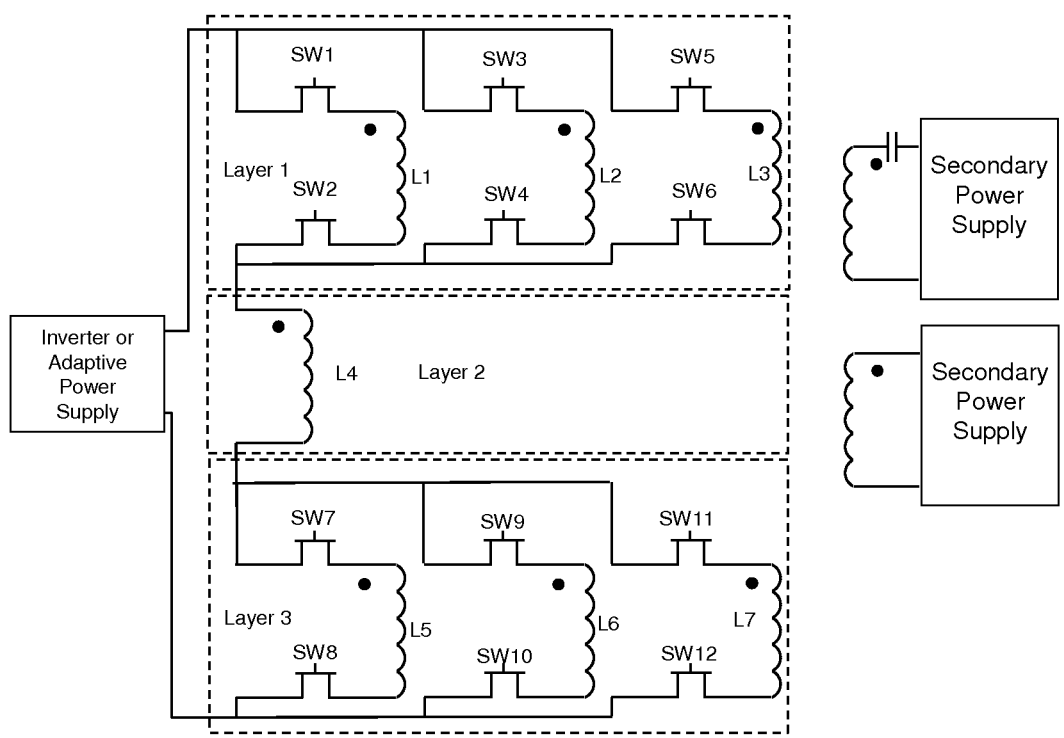
FIG. 9A shows one embodiment of a circuit diagram for a seven coil, three layer, coil array.

FIG. 9A provides a circuit diagram of the structure in one embodiment of a seven coil, three layer, selectable coil circuit. The first layer includes coils L1, L2, and L3. The second layer includes coil L4. The third layer includes coils L5, L6, and L7. The L1 coil is connected to the SW1 switch and the SW2 switch. The L2 coil is connected to the SW3 switch and the SW4 switch. The L3 coil is connected to the SW5 switch and the SW6 switch. The L4 coil is connected to the SW2, SW4, SW6, SW7, SW9, and SW11 switches. The L5 coil is connected to the SW7 and SW8 switches. The L6 coil is connected to the SW10 switch. The L7 coil is connected to the SW11 switch and the SW12 switch. One lead from the inductive power supply is connected to the SW1, SW3, and SW5 switches and another lead from the inductive power supply is connected to the SW8, SW10, and SW12 switches. The switches in the current embodiment are field effect transistors. In alternative embodiments different types of switches can be utilized. In the current embodiment, each coil is connected to two switches, in alternative embodiments a single switch for each coil may be utilized. The secondary device on the charging surface may or may not include a secondary resonant capacitor.

The states of the switches in order to energize appropriate coils to create the 6 zones of power shown in FIG. 8 are illustrated in FIG. 9B. As shown in FIG. 8C, zone 1 is active when coils L1, L4, and L6 are energized, which can be accomplished by turning switches SW1, SW2, SW9, and SW10 on and turning the other switches off. As shown in FIG. 8D, zone 2 is active when coils L3, L4, and L6 are energized, which can be accomplished by turning switches SW5, SW6, SW9, and SW10 on and turning the other switches off. As shown in FIG. 8E, zone 3 is active when coils L3, L4, and L7 are energized, which can be accomplished by turning switches SW5, SW6, SW11, and SW12 on and turning the other switches off. As shown in FIG. 8F, zone 4 is active when coils L2, L4, and L7 are energized, which can be accomplished by turning switches SW3, SW4, SW11, and SW12 on and turning the other switches off. As shown in FIG. 8G, zone 5 is active when coils L2, L4, and L5 are energized, which can be accomplished by turning switches SW3, SW4, SW7, and SW8 on and turning the other switches off. As shown in FIG. 8H, zone 6 is active when coils L1, L4, and L5 are energized, which can be accomplished by turning switches SW1, SW2, SW7, and SW8 on and turning the other switches off.

FIG. 10 illustrates an alternative embodiment where the coils are individually selectable and each coil includes a series resonant capacitor as shown in FIG. 22. In alternative embodiments, the coils may be individually selectable, but not include a series resonant capacitor. In this embodiment the individual coils are selected by the switches in order to form an energized zone created by powering one, two, or three coils in parallel. Each of the original six zones can be created by energizing the same sets of three coils as described above. In addition, any two adjacent coils can be energized simultaneously to create additional zones. Three exemplary zones are illustrated as FIG. 10A, 10B, and 10C. In FIG. 10A, coils L6 and L4 are energized. In FIG. 10B, coil L1 and L4 are energized. In FIG. 10C coils L1 and L6 are energized. In other embodiments, any two coils in the array may be energized to create a zone, not just any two adjacent coils as in the current embodiment. Each individual coil may also be energized alone in the current embodiment. For example, in FIG. 10D coil L4 is energized alone. In FIG. 10E coil L6 is energized alone. In FIG. 10F, coil L1 is energized alone.

FIGS. 11-12 illustrate one embodiment of a twelve coil, three layer, selectable coil circuit. The arrangement of coils results in seven potential zones that can be energized to provide power. As shown in FIG. 11, the seven zones that can be selected are represented by energizing three coils at a time. The coils may be energized in series or in parallel.

FIGS. 12A-G illustrate the different groups of three primary coils that can be energized in order to create the seven different zones. In this embodiment, the secondary device is provided with a single degree of freedom to slide along the line of zones.

Figure 13:
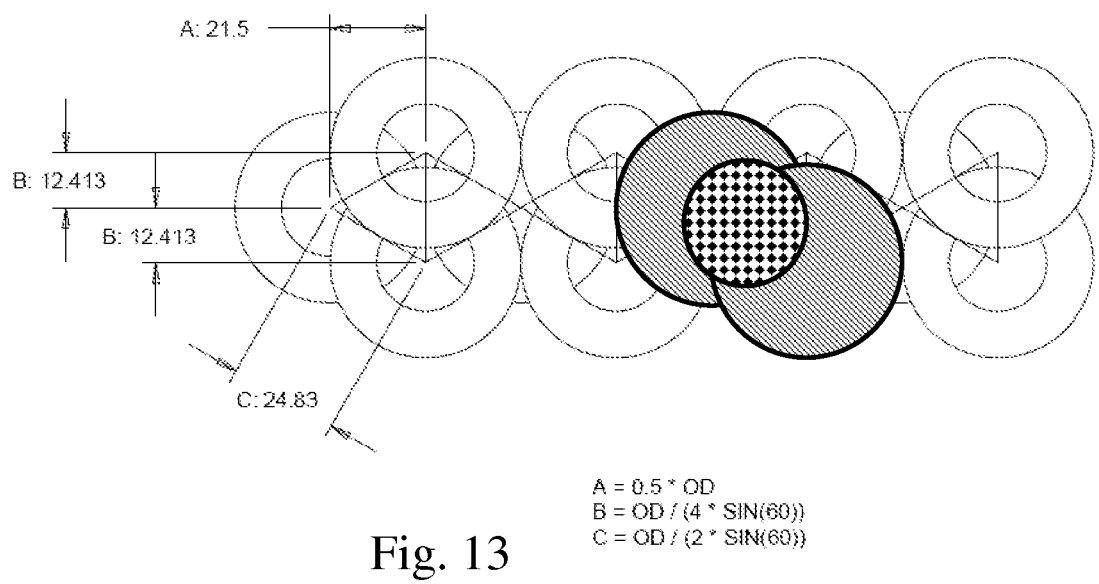
FIG. 13 shows how the coils from FIG. 11 can be activated by energizing one, two, or three coils at a time.

FIG. 13 illustrates how additional zones can be created by energizing fewer than three coils at a time. Additional spatial freedom can be achieved by energizing any combination of one or two coils in addition to the zones created by energizing three coils. This also can provide some spatial freedom in additional directions as well. That is, with an array of coils that may be selected in various numbers, increased spatial freedom can be achieved by moving the center of the high flux zones.

Figure 14A:
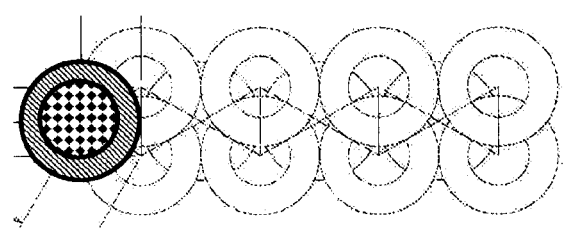
FIGS. 14A-C shows some exemplary combinations of primary coils from FIG. 11 that can be selected to provide spatial freedom to a secondary device.
Figure 14B:
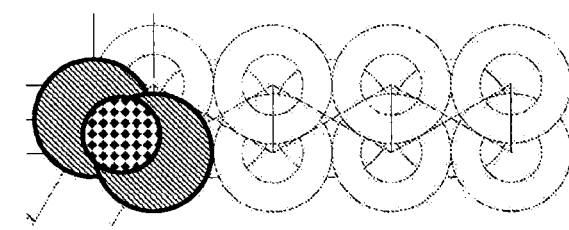
Figure 14C:
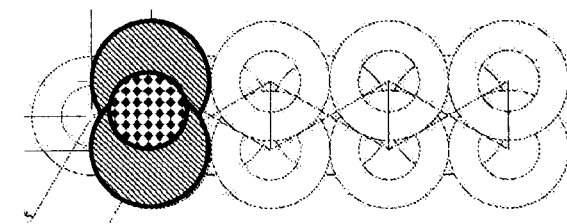

FIGS. 14A-C illustrate the increased spatial freedom that results from the ability to select one, two, or three coils. FIG. 14A illustrates how one coil alone can be activated to create a zone of higher magnetic flux when the secondary device is aligned with a single coil. FIG. 14B and 14C illustrate how two coils can be activated simultaneously to create a zone of higher magnetic flux. FIG. 14B also illustrates that the zone of peak magnetic flux is produced outside the axes of the original seven zones that can be created by activating three adjacent coils in the line multi-layer coil array. FIGS. 14A and 14C illustrates how additional zones can be created along the same axes as the original seven zones to provide additional resolution so that a device has an opportunity to obtain better alignment by use of a zone that is not constructed utilizing three coils.

Figure 15:
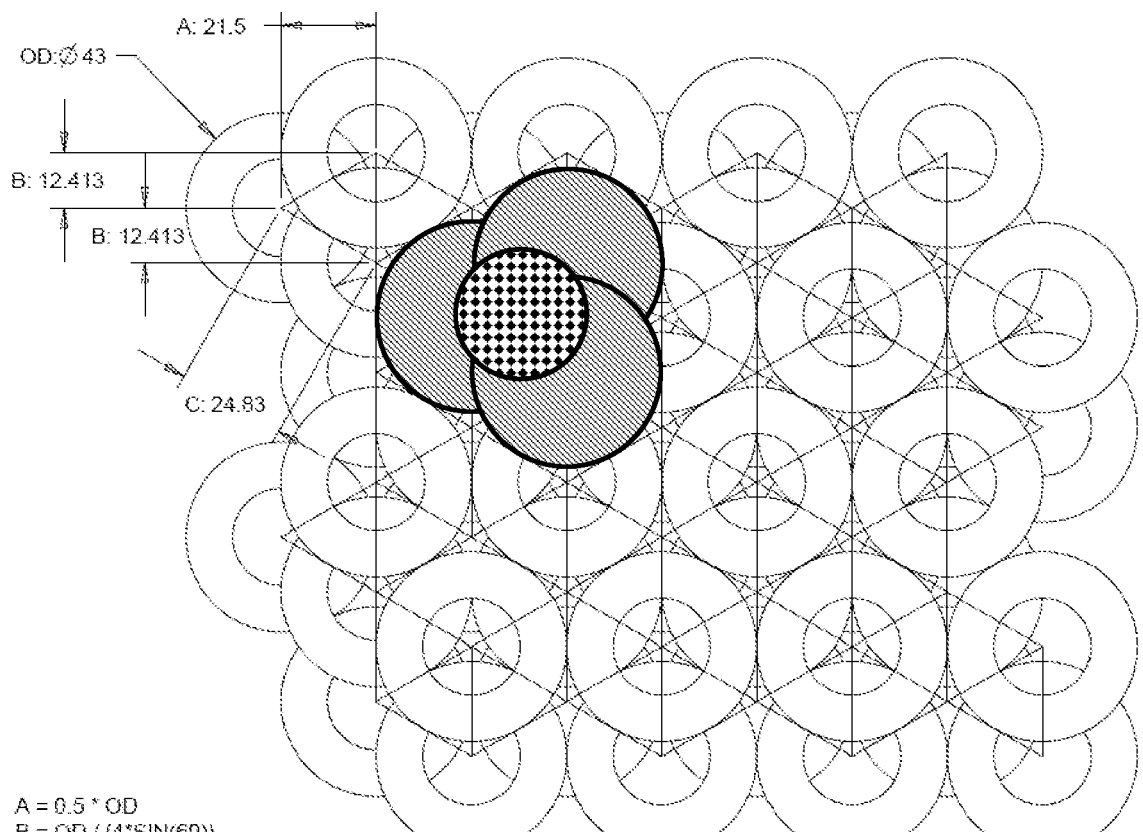
FIG. 15 shows a single low power secondary device charging on a large coil array.

FIG. 15 shows a representational diagram of one embodiment of a single low power secondary device charging on a large array made up of 48 coils in three layers (16 coils per layer). In this embodiment, the secondary device is powered by power supplied by one zone. The coils are arranged in a basic rectangular patter with 48 coils with 16 coils per layer, spread across three layers. In alternative embodiments, the coil array could be any shape and any number of coils as long as the overlapping equilateral triangular spacing pattern is maintained. In other embodiments, the equilateral triangular spacing pattern may be altered, for example where the coils are different shapes or sizes.

FIG. 15 shows how three coils can be energized to provide power to one small secondary device, represented by the dotted circle. Any of the triangular zones shown could be activated in a similar manner by energizing three coils in the same pattern around the desired zone. The three coils that are energized can be driven in series or parallel by a single or multiple controllers using any of the coil circuit configurations shown in FIGS. 21-23. Specifically, the coil array can be wired with sets of three coils connected in parallel (FIG. 20), with sets of three coils connected in series (FIG. 21), or with individually selectable coils (FIG. 22). Multiple sets of coils in the FIGS. 20 and 21 configurations can be activated simultaneously and any combination of coils can be activated in the FIG. 20 configuration.

Figure 16:
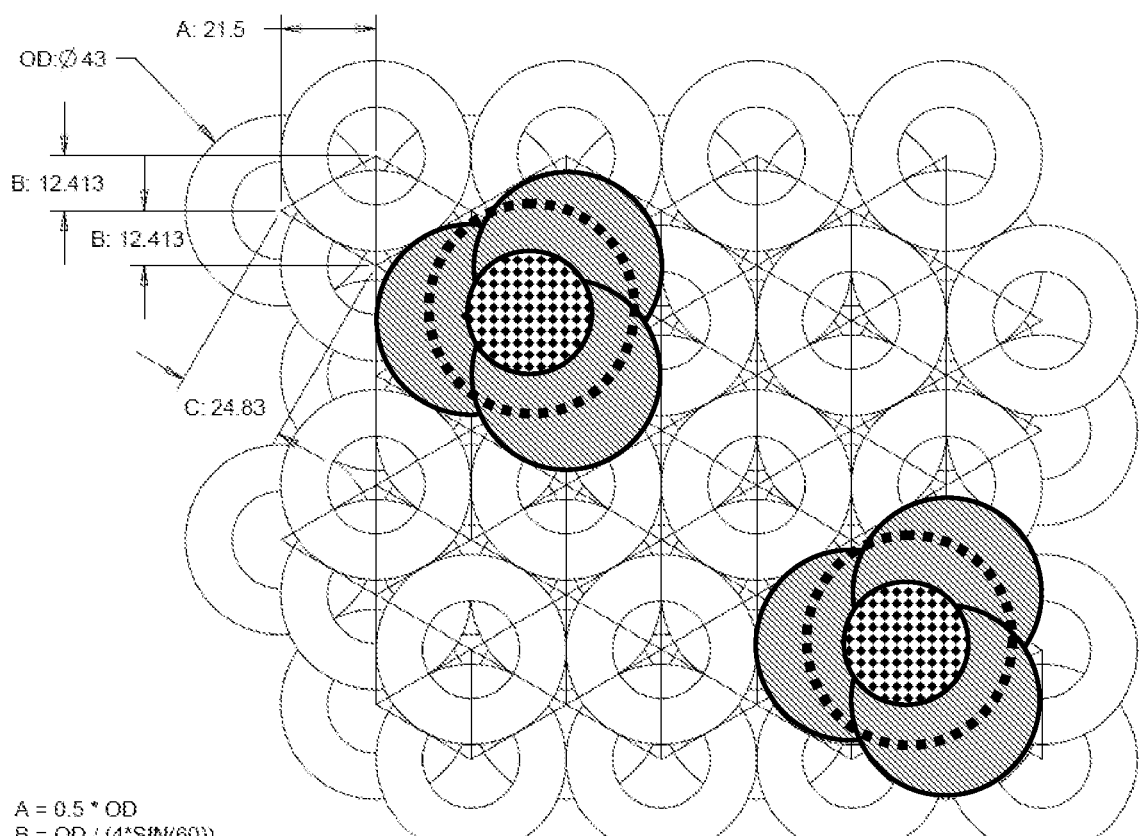
FIG. 16 shows multiple low power secondary devices charging on one embodiment of a large coil array.

FIG. 16 shows one embodiment of multiple low power secondary devices charging on a large array of coils. In this embodiment, each secondary device is powered by one zone. The coils are arranged in a basic rectangular patter with 48 coils, with 16 coils per layer spread across three layers. However, in alternative embodiments, the array could be any shape and number of coils as long as the overlapping equilateral triangular spacing pattern is maintained. Just as with the coil array shown in FIG. 15, any of the coil array circuit configurations shown in FIGS. 21-23 can be implemented. FIG. 16 shows how six coils can be energized to provide power to two small secondary devices, represented by the dotted circles. Any of the triangular zones shown could be activated in a similar manner by energizing three coils per device in the same pattern around the desired zones. Any three coils that are energized can be driven in series or parallel by a single or multiple controllers.

Figure 17:
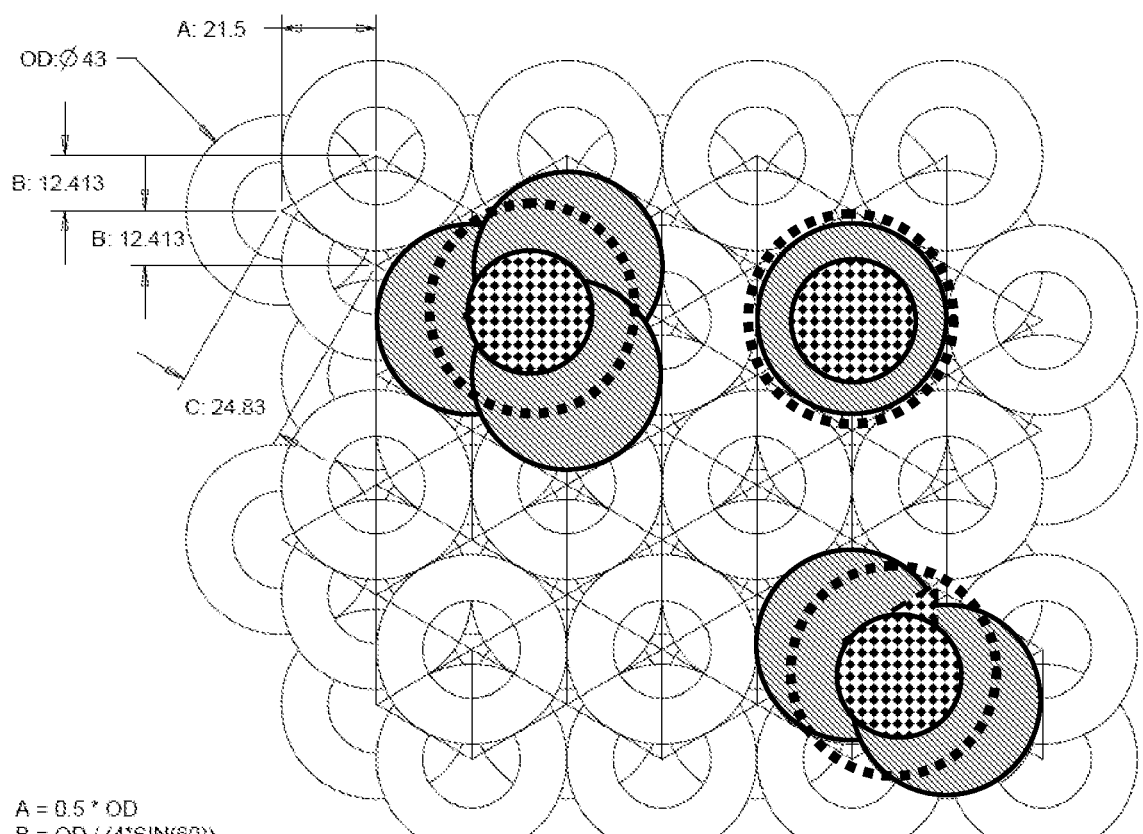
FIG. 17 shows multiple low power secondary devices charging on another embodiment of a large coil array.

FIG. 17 shows one embodiment of multiple low power secondary devices charging on a large array of coils. In this embodiment, additional zones are available because in addition to being able to activate three coils at a time, other combinations of coils can be activated to create additional zones. For example, in the illustrated embodiment, a zone created by a single coil is shown and a zone created by two coils being activated simultaneously is shown. The figure shows how coils can be energized to provide power to three small secondary devices, represented by the dotted circles. The devices could be powered using one, two, or three primary coils. In the current embodiment, the zones to be activated are determined based on the position of the secondary coils. In alternative embodiments additional or different factors could be utilized to determine which zones to activate.

Figure 18:
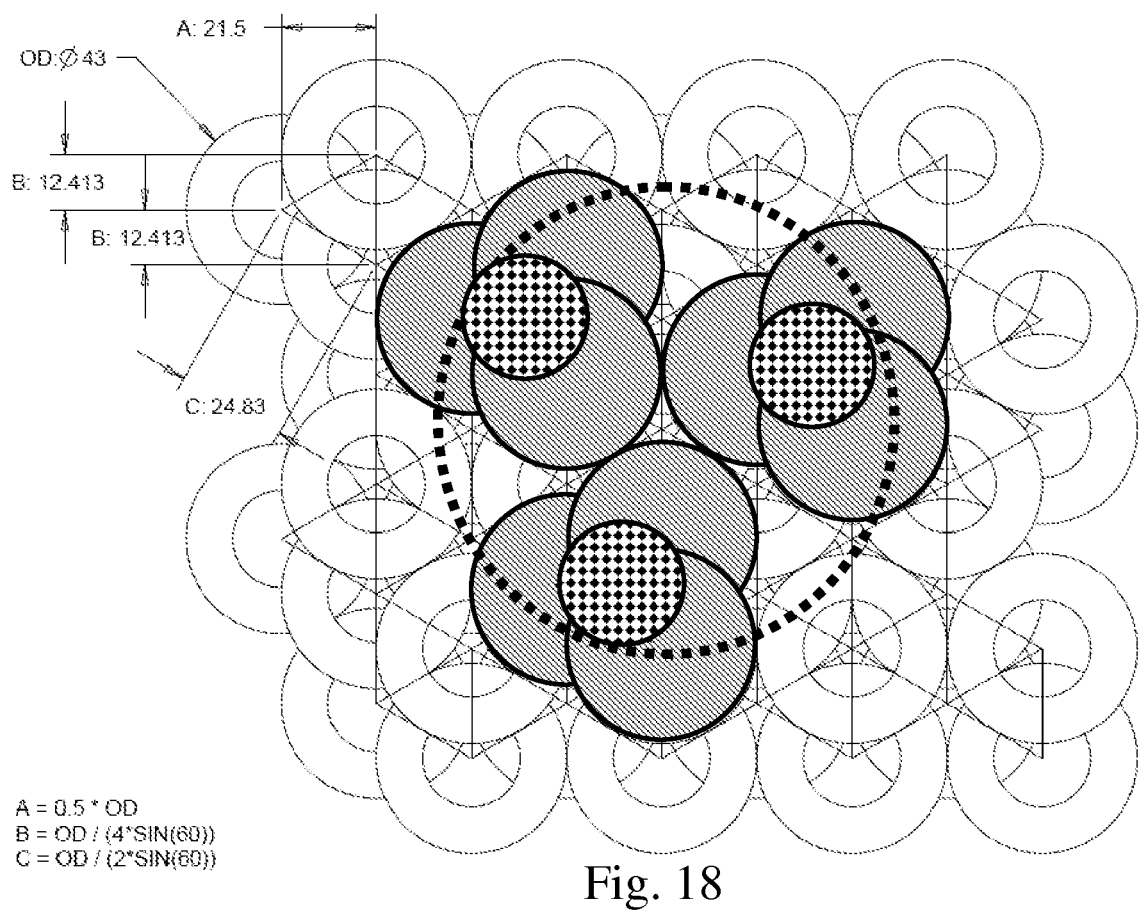
FIG. 18 shows a single medium to high power secondary device charging on a large array with multiple zones energized.

FIG. 18 shows one embodiment of a single medium to high power secondary device charging on a large array with multiple zones energized. Each energized zone adds to the power transferring to the secondary device. In this embodiment, the secondary device draws power supplied by multiple zones. The coils are arranged in a basic rectangular patter with 48 coils, with 16 coils per layer spread out across three layers. However, in alternative embodiments, the array could be any shape and number of coils. Here, the figure shows how nine coils can be energized to provide power to one secondary device, represented by the dotted circle. Any of the triangular zones shown could be activated in a similar manner by energizing three coils per device in the same pattern around the desired zones. Any three coils that are energized can be driven in series or parallel by a single or multiple controllers.

Figure 19:
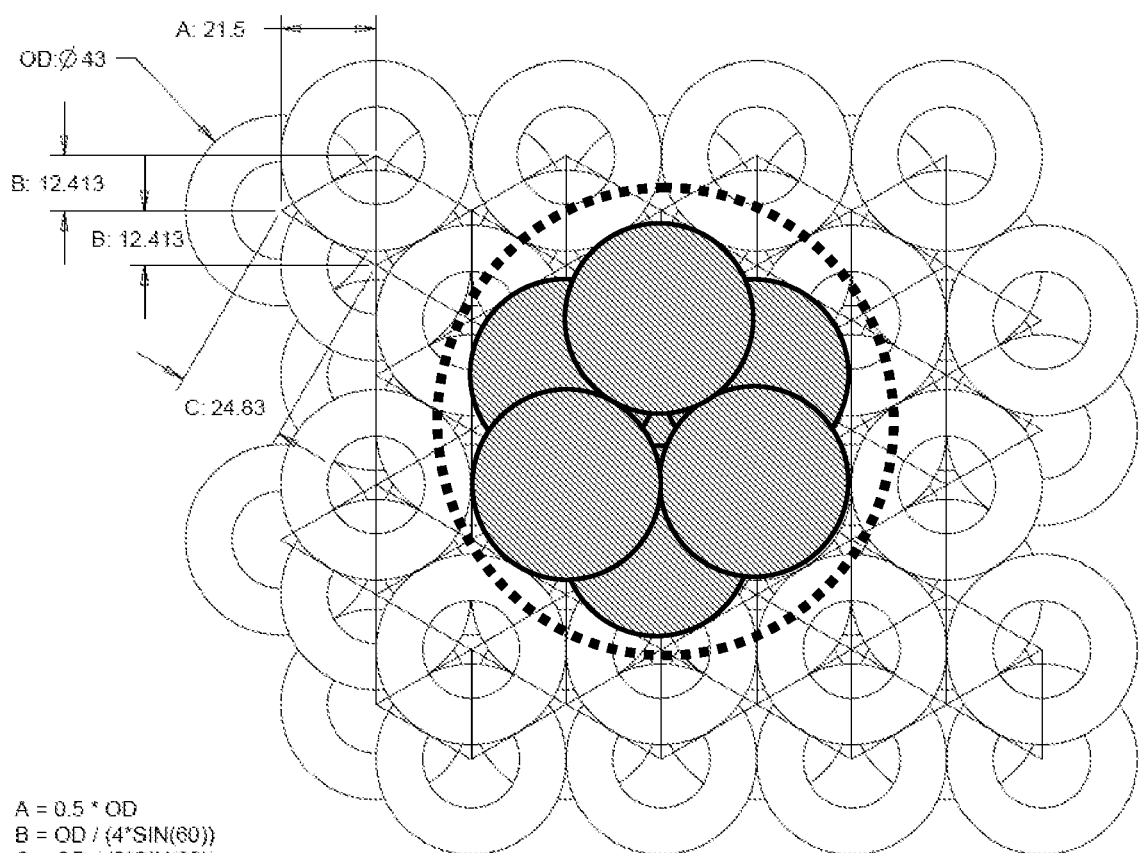
FIG. 19 shows a single medium to high power secondary device charging on a large array with a single zone energized using multiple primary coils.

FIG. 19 shows how nine coils can be energized to provide power to one secondary device, represented by the dotted circle. Any of the triangular zones shown could be activated in a similar manner by energizing three coils per device in the same pattern around the desired zones. Any three coils that are energized can be driven in series or parallel by a single or multiple controllers. Utilizing the coil circuit configuration shown in FIG. 22, individual coils can be activated to provide an appropriate zone for providing power to the secondary device depicted in FIG. 19. Here, the figure shows how seven coils can be energized to provide power to one secondary devices, represented by the dotted circle. This is accomplished by powering the seven coils that create flux within the diameter of the secondary coil. In this design, the secondary device only requires one coil. The number of primary coils used can depend on the size and position of the secondary coil, as well as the power required by the secondary device.

Figure 23:
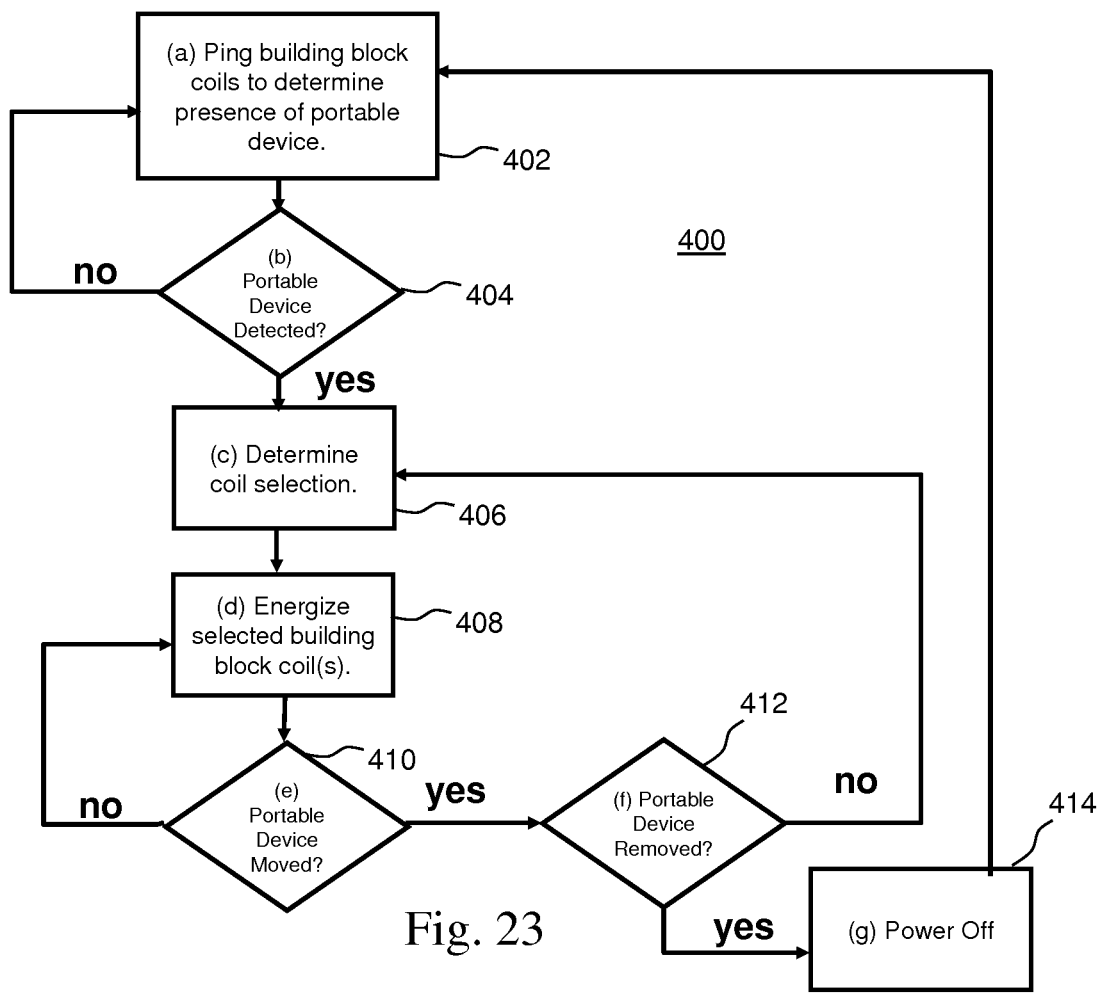
FIG. 23 shows a flow chart of one embodiment of a process to detect a load and provide power.

FIG. 23 shows a flow chart of one embodiment of a process to detect a load and provide power using an array of building block coils 400. The steps of the process include pinging individual building block coils to determine presence of a secondary device 402. The pings can be initiated on a periodic basis or as the result of some other event, such as a hall effect sensor. In response to detecting a secondary device 404, determining coil selection 406. One embodiment of a process for determining coil selection is described below in connection with FIG. 24. Once coil selection is determined, the building block coils are energized 408 until it is determined that the device has moved 410 or been removed 412. If the secondary device is removed from the charging surface, then the coil array can be powered off 414 and the system can revert to pinging the building blocks. In alternative embodiments, different conditions may used to begin or end energizing the building block coils.

Figure 24:
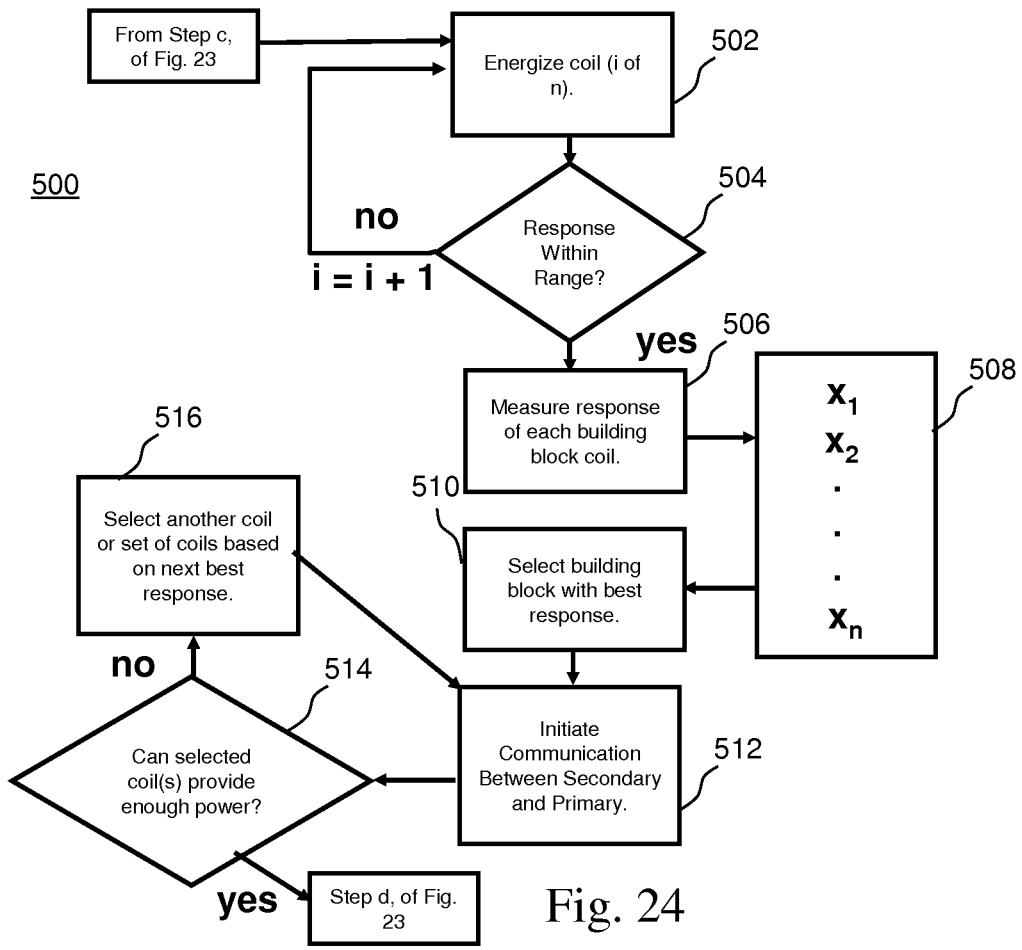
FIG. 24 shows an expanded portion of the flow chart of FIG. 23 showing one embodiment of a process for determining which coils to energize.

FIG. 24 shows one embodiment of a process for determining coil selection from FIG. 23 500. Each of the building block coils are energized 502 and it is determined whether or not the response is within range 504. The response of each building block coil is measured 506, temporarily stored in memory 508, and the building block with the best response is selected 510. Communication between the secondary and the primary is initiated 512 and a determination is made of whether the selected coil or coils can provide enough power 514. If sufficient power cannot be provided then another coil is selected based on the next best response 516. If sufficient power can be provided then that building block is deemed the determined coil selection.

Figure 25:
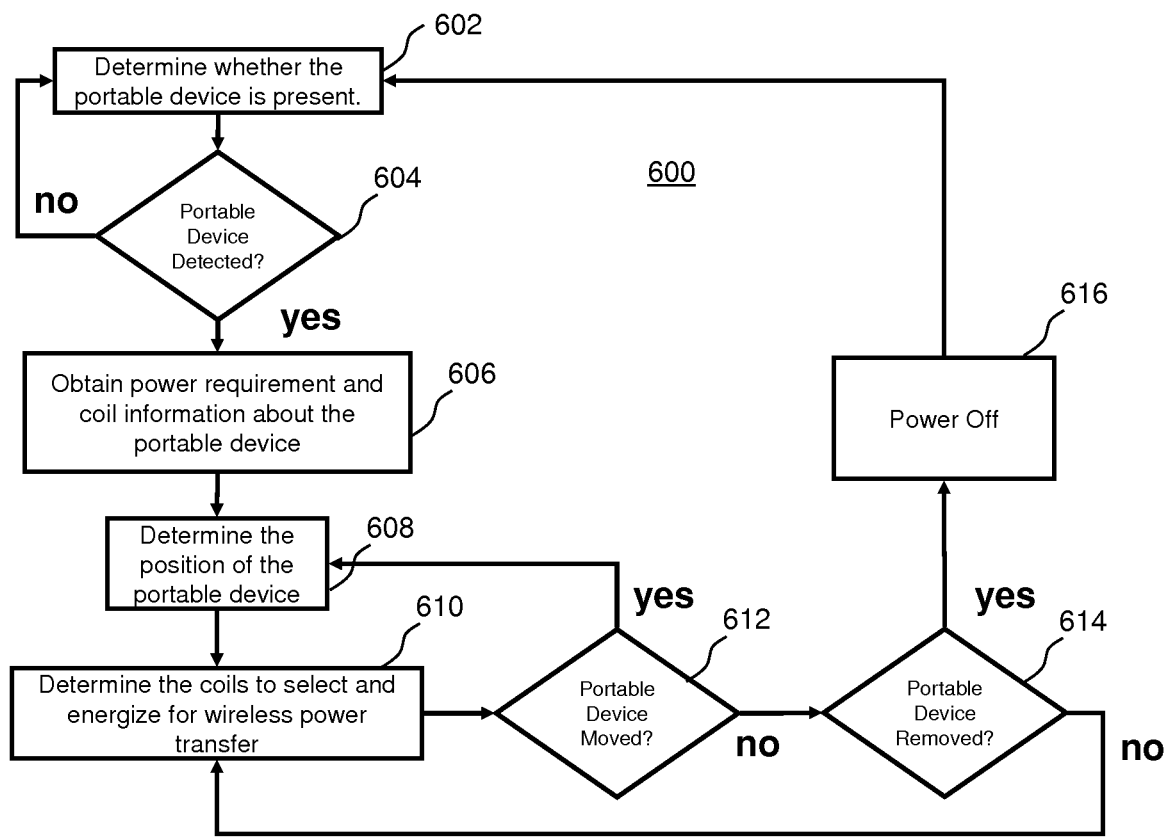
FIG. 25 shows a flow chart of one embodiment of a process to detect a load and provide power for designs using parallel resonant circuits.

FIG. 25 shows another embodiment of a method for detecting a load and providing power using an array of coils 600. The steps of the method include determining whether the secondary device is present on the charging surface 602. This can be done with a digital presence detector, by pinging one or more of the coils, or by any other presence detection process.

In response to determining that a secondary device has been detected 604, the process obtains power requirement information and coil information about the secondary device 606. In one embodiment, the coil array system communicates with the secondary device to obtain the information. For example, the secondary device may be programmed to transmit the information in response to a digital ping. In alternative embodiments, the coil array system may utilize a transceiver or other communication system to request the information from the secondary device. In some embodiments, the secondary device may transmit an identification signal to the coil array system, and the coil array system can look up the relevant information in a database based on the identification. In yet another alternative embodiment, the some information may be detected without communicating the secondary device. For example, by pinging coils in the coil array and measuring the responses, it may be possible to determine the coil geometry of the secondary coil in the secondary device. The specific information obtained can vary from application to application. In some embodiments, the power requirement information may include the amount of volts or watts that the secondary device requires. Examples of coil information that can be obtained includes the shape, size, classification, and number of turns on the coil.

The process also determines the position of the secondary device. This can be done utilizing any of a variety of different methods. In the current embodiment, the position of the device can be determined by pinging the coils on the coil array, detecting changes in the primary coils and analyzing the relative values of the changes in the primary coils. Two specific embodiments of a method for determining the location of a secondary device are describe with respect to FIG. 26 and FIG. 27.

Figure 26:
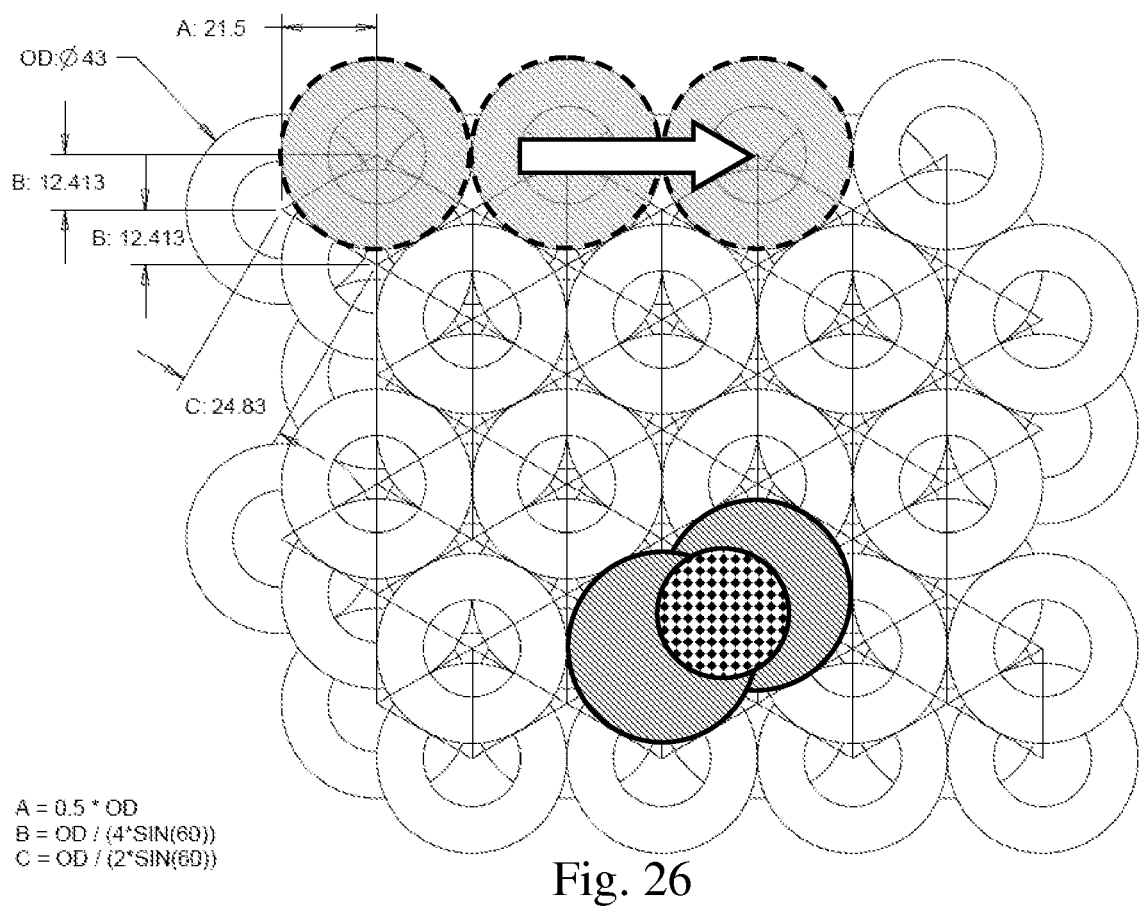
FIG. 26 shows a visual representation of one method for determining the position of a secondary device on the charging surface.

FIG. 26 is helpful in describing one embodiment of a method of pinging a selectable coil array to locate the position of a secondary device. In the FIG. 26 embodiment, individual coils are pinged one at a time. A current sensor can be utilized on the primary side to measure the response as each primary coil is pinged. The current in the primary coil will be effected by the reflected impedance of the secondary coil and the reflected impedance is a function of the distance between the primary and secondary coil. In this way, the measured current for each coil that is pinged provides a relative distance measurement. In general, the closer the pinged coil is to the secondary coil, the higher the current sense measurement. Accordingly, by analyzing the responses to pinging the coils, the position of the secondary device can be determined. For example, where the current is the highest the position of the secondary coil of the secondary device is known to be closest. In some embodiments, a rough position may be all that is necessary. In embodiments where a more accurate position measurement is desired, additional techniques can be utilized to determine the position with increased resolution. For example, triangulation may be utilized to determine the position utilizing additional data points. Or, in other circumstances, the coil geometry information may be utilized. In some embodiments, just a single layer of coils is progressively pinged. In alternative embodiments, multiple layers of coils are progressively pinged. In addition, the data between layers may be modified to compensate for the vertical distance between the layers so that pings between coils in different layers can be compared more easily. In other embodiments, the vertical distance between coils in different layers does not have an appreciable effect on the results of the ping and can be ignored.

Figure 27:
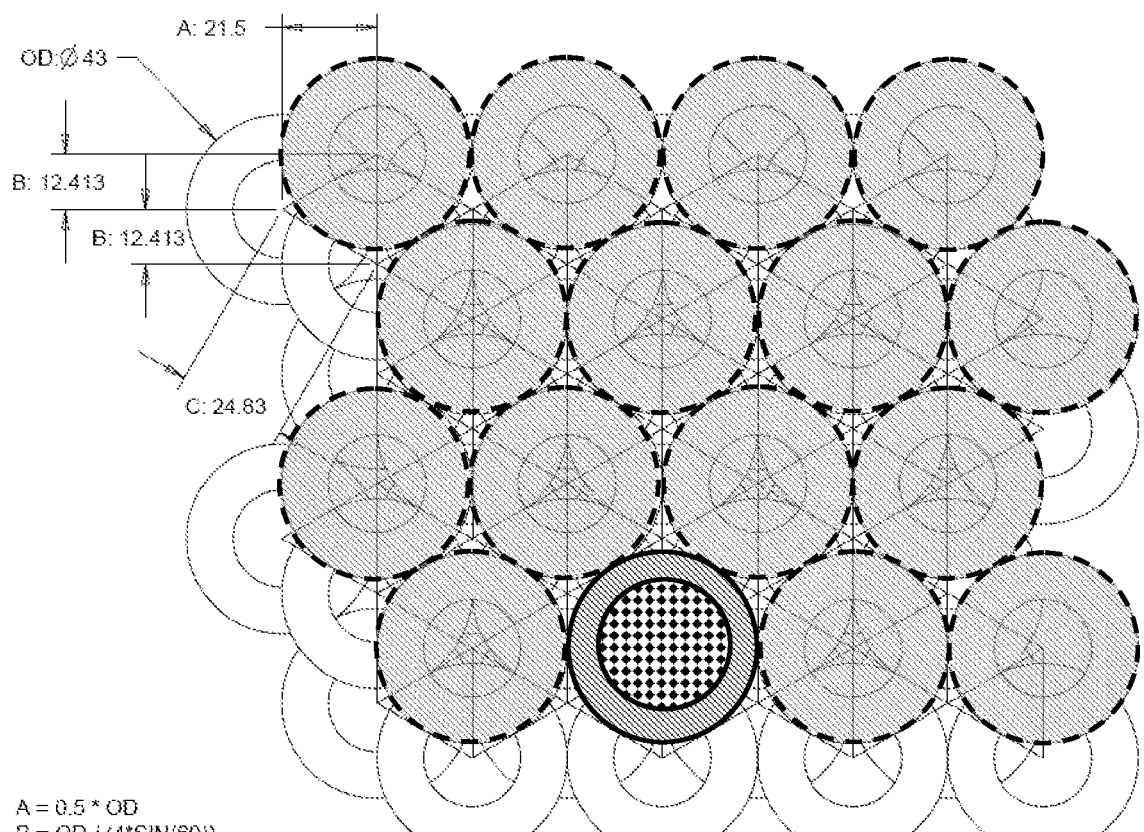
FIG. 27 shows a visual representation of another method for determining the position of a secondary device on the charging surface.

FIG. 27 is helpful in illustrating another embodiment of a method of pinging a selectable coil array to locate the position of a secondary device. In the FIG. 27 embodiment, sets of coils are pinged simultaneously to determine if there is a device present in that area and then the area is divided into smaller areas, which are pinged to determine if the device is present in that area. If a device is found, the coil array may be divided into multiple zones of surface coils and each of those zones may be pinged individually to determine which zone the device is located. This process may be repeated until the appropriate level of resolution is reached regarding the device position. The accuracy of the position information may be further increased by including coils from the other layers. FIG. 27 illustrates all of the surface coils of a coil array being activated simultaneously. This technique can be utilized for the threshold inquiry of whether a secondary device is present on the charging surface at all 602. In the current embodiment 16 coils are energized. In one embodiment the 16 coils could be split into two groups of eight coils. For example, the coil array system can ping the eight coils located near the top of the coil array and separately ping the eight coils located near the bottom of the coil array. Given the position of the secondary coil shown on FIG. 27, the result of the ping will reveal that the secondary device is located closer to the bottom eight coils than the top eight coils. The bottom eight coils can then be split into four coils near the left side of the coil array and the four coils near the right side of the coil array and each group of coils can be pinged separately. Again, given the position of the secondary coil shown on FIG. 27, the pinging will reveal that the secondary coil is closer to the four coils near the left side of the coil array. This process could be repeated two more times utilizing the surface coils. Although the process was described above in connection with the surface coils, this same technique could be applied while simultaneously pinging coils on multiple layers or just a different layer. In addition, the divide and conquer approach can be combined with the progressive ping approach described in connection with FIG. 26. For example, once the system determines a general area where the secondary coil is located, it may be possible to individually ping a number of coils near that area to determine the position.

The above two methods of pinging an array of coils are merely exemplary. Other methods for determining the location of the secondary coil on the charging surface can be utilized. For example, the charging surface could include one or more sensors specifically for assisting in determining the position of the secondary coil or the secondary device on the charging surface. Further, it should be understanding that in some circumstances, determining position may include determining pitch, yaw, and orientation. In the current embodiment, where spiral coils are being employed, position merely describes the x,y location of the secondary device on the charging surface. In embodiments where the primary or secondary coils have oblong or other shapes, it may be possible to determine pitch, yaw, or orientation of the secondary coil.

The system can determine a coil configuration as a function of the position information, power requirement information, and the coil information, as well as any other additional information. Once a coil configuration is determined, the coils for that specific configuration can be selected and power can be provided to create a magnetic field at the desired zone. In some embodiments, position information may be the sole factor for determining the coil configuration. In other embodiments, power requirement information may change the minimum number of coils that need to be energized in order to provide the requisite power for the device. Further, the illustrated secondary coils of the current embodiments are all spiral coils. Where the secondary coil has a different geometry, the coil array system could alter the zone of peak magnetic field that is to be created to accommodate that geometry.

Power can be supplied to the secondary device until the secondary device is moved 612 or removed from the charging surface 614. If the device is removed from the charging surface the coil array is powered off 616 and returns to pinging 602.

There are a number of benefits that may be achieved by using one or more embodiments of the selectable coil array system. For example, the selectable coil array system can be lower cost to manufacture and run than other interoperable solutions. The selectable coil array system can enable a wide array of interoperable receivers. The selectable coil array solution can help to assure interoperable communications. The selectable coil array system can increase or maximize X/Y & Z axis freedom. The selectable coil array system can provide a variable power solution in a free position array. The selectable coil array can provide a solution to drive series resonant systems. The selectable coil array system can provide a solution to drive receivers without a series resonant capacitor. The selectable coil array system can assure maximum or increased efficiency for power transfer. The selectable coil array system can enable smaller receivers. The selectable coil array system can enable manufacturers to have increased design flexibility.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A coil array system comprising:
   a driver circuit, wherein the driver circuit is arranged to generate one or more AC signals;
   a selectable coil array comprising:
      a plurality of coils arranged in a plurality of layers, wherein the plurality of coils comprises:
         a first subset; and
         a second subset different from the first subset, and
      the plurality of layers comprises: a first layer; and a second layer,
      wherein the selectable coil array is associated with a charging surface,
      wherein the changing surface is arranged for the placement of a first secondary device and a second secondary device,
      wherein the first layer is beneath the charging surface and the second layer is beneath the first layer; and
   a plurality of switches arranged to selectively electrically connect the first subset to the driver circuit in order to generate a first magnetic field and selectively electrically connect the second subset to the driver circuit in order to generate a second magnetic field,
   wherein the driver circuit provides one of the one or more AC signals to the first subset, and
   wherein the driver circuit provides one of the one or more AC signals to the second subset,
   a position detection system, wherein the position detection system is arranged to obtain a first position information regarding a secondary coil of the first secondary device and a second position information regarding a secondary coil of the second secondary device; and
   a controller circuit, wherein the controller circuit is arranged to operate the selectable coil array as a function of the first position information in order to position the first magnetic field relative to a position of a first secondary coil of the first secondary device on the charging surface and to simultaneously operate the selectable coil array as a function of the second position information in order to position the second magnetic field relative to a position of a second secondary coil of the secondary device on the charging surface, wherein the number of coils of the first subset depends at least in part on the first secondary device position information, wherein the number of coils of the second subset depends at least in part on the second secondary device position information, and wherein in response to the first position information, the controller circuit is arranged to selectively electrically connect, to the driver circuit as the first subset, two coils that overlap with each other as viewed in a vertical direction perpendicular to the charging surface; and wherein in response to the second position information, the controller circuit is arranged to selectively electrically connect, to the driver circuit as the second subset, different two coils that overlap with each other as viewed in the vertical direction perpendicular to the charging surface;

wherein the selectable coil array is arranged to transmit a ping signal to the first secondary device;

wherein the selectable coil array obtains, from the first secondary device, coil information about the secondary coil of the first secondary device in response to the ping signal;

wherein the selectable coil array is arranged to transmit a ping signal to the second secondary device;

wherein the selectable coil array obtains, from the second secondary device, coil information about the secondary coil of the second secondary device in response to the ping signal;

wherein the coil information of the first secondary device and the second secondary device includes at least one of: the shape, size, classification, and number of turns on the coil.

2. The coil array system of claim 1, wherein the position detection system includes at least one of the controller circuit, a primary current detector, primary voltage detector, input current detector, input voltage detector, secondary current detector, secondary voltage detector, primary and secondary communication system, or any combination thereof.

3. The coil array system of claim 1, wherein the number of coils selectively electrically connected to the driver circuit in the coil array is a function of the power requirements of the first secondary device and the second secondary device.

4. The coil array system of claim 1,
wherein the controller circuit is arranged to obtain the first position information of the first secondary device and the second position information of the second secondary device by pinging a first portion of the plurality of coils, wherein the controller circuit is arranged to measure a response to the ping of each of the pinged coils, wherein the controller circuit is arranged to compare the measurements to determine the first position information with respect to a position of the first portion of coils and the second position information with respect to the position of the first portion of coils.

5. The coil array system of claim 4,
wherein the controller circuit is arranged to obtain the first position information and to obtain the second position information by pinging a second portion of the plurality of coils, wherein the controller circuit is arranged to receive secondary position information from the first secondary device and the second secondary device for each pinged coil, wherein the controller circuit is arranged to compare the secondary position information to determine the position of the first secondary coil of the secondary device with respect to a position of the pinged coils and of the secondary coil of the second secondary device with respect to the position of the pinged coils.

6. The coil array system of claim 1, wherein the controller circuit is arranged to operate the selectable coil array as a function of the first position information and the second position information in order to position a peak of the first magnetic field relative to the position of the first secondary coil on the charging surface and in order to position a peak of the second magnetic field relative to the position of the second secondary coil on the charging surface.

7. The coil array system of claim 1,
wherein each of the plurality of coils is electrically connected with a separate series resonant capacitor, and wherein a resonance point of each coil of the plurality of coils is maintained independent of the number of coils selectively electrically connected in parallel to the driver circuit in the coil array system.

8. The coil array system of claim 1,
wherein at least a portion of the plurality of coils are overlapping, wherein the plurality of overlapping coils are successively layered along a plurality of different axes to provide spatial freedom in a plurality of directions.

9. The coil array system of claim 8, wherein the plurality of overlapping coils all have the same dimensions.

10. The coil array system of claim 9, wherein at least two of the plurality of overlapping coils have a different number of winding turns.

11. A selectable coil array comprising:
one or more driver circuits, wherein each of the one or more driver circuits is configured to generate an AC signal;

a selectable coil array comprising:
a plurality of coils arranged in a plurality of layers,
wherein the plurality of coils comprises a first subset, and the plurality of layers comprises: a first layer; and a second layer, wherein the selectable coil array is associated with a charging surface, wherein the changing surface is arranged for the placement of a secondary device, wherein the first layer is beneath the charging surface and the second layer is beneath the first layer of coils; and a plurality of switches arranged to selectively electrically connect the first subset is in parallel to at least one of the one or more driver circuits in order to generate a first magnetic field in the first subset; and a position detection system, wherein the position detection system is arranged to obtain a position information regarding a secondary coil of the secondary device placed on the charging surface, wherein in response to the position information, a controller circuit is arranged to selectively electrically connect, to the one or more driver circuits as the first subset, two coils that overlap with each other as viewed in a vertical direction perpendicular to the charging surface;

wherein the selectable coil array is arranged to transmit a ping signal to the secondary device;
wherein the selectable coil array obtains, from the secondary device coil, information about the secondary coil of the secondary device in response to the ping signal;
wherein the coil information includes at least one of: the shape, size, classification, and number of turns on the coil.

12. The selectable coil array of claim 11, wherein one side of the selectable coil array is shielded.

13. The selectable coil array of claim 12,
wherein each coil of the plurality of coils is electrically connected in series with a separate resonant capacitor,
wherein value of each of the series resonant capacitor is selected as a function of the distance between the coil and a shielding in order to maintain the same resonant point for each of the coils in the array.

14. The selectable coil array of claim 11, wherein the number of coils selectively electrically connected to an AC input in the coil array is a function of the power requirements of the secondary device.

15. The selectable coil array of claim 11, wherein each of the plurality of coils are physically similar and the center of each coil is located one radius from the center of each other coil in the array.

16. The selectable coil array of claim 11,
wherein each of the plurality of coils is electrically connected with a separate series resonant capacitor, and
wherein a resonance point of each coil of the plurality of coils is maintained independent of the number of coils selectively electrically connected in parallel to the one or more driver circuits in the selectable coil array.

17. The selectable coil array of claim 11,
wherein the plurality of coils are overlapping, and
wherein the plurality of overlapping coils are successively layered along a plurality of different axes to provide spatial freedom in a plurality of directions.

18. The selectable coil array of claim 17,
wherein the plurality of overlapping coils all have the same dimensions, and
wherein at least two of the plurality of overlapping coils have a different number of winding turns.

19. A method for wirelessly powering a secondary device on a charging surface of a selectable coil array, wherein the selectable coil array comprises: a plurality of coils arranged in a plurality of layers; and a plurality of switches, wherein the plurality of layers comprise: a first layer; and a second layer, wherein the plurality of coils comprise a first subset and, and wherein the first layer is beneath the charging surface and the second layer is arranged beneath the first layer, the method comprising:
determining whether a secondary device is present;
transmitting a ping signal to the secondary device;
obtaining power requirement information about the secondary device;
obtaining, from the secondary device, coil information about a secondary coil of the secondary device in response to the ping signal;
wherein the coil information includes at least one of: the shape, size, classification, and number of turns on the coil;
determining the position of the secondary device on the charging surface; and
selecting two or more coils of the plurality of coils as the first subset of coils to provide power to the secondary coil of the secondary device as a function of at least the power requirement information, the coil information, and the position of the secondary coil on the charging surface,
wherein in response to position information of the secondary device, the selecting two or more coils of the plurality of coils as the subset includes selecting two coils that overlap with each other as viewed in a vertical direction perpendicular to the charging surface;
energizing the first subset with an AC signal from at least one driver circuit of at least one driver circuit to provide wireless power to the secondary coil of the secondary device,
wherein the selectable coil array is operably coupled to the one driver circuit of the at least one driver circuit such that the one driver circuit is operable to provide the AC signal to each coil of the plurality of coils.

20. The method of claim 19, wherein the determining the position of the secondary device comprises:
pinging each of the plurality of coils;
obtaining a measurement of the power received in the secondary coil of the secondary device in response to each individual ping,
wherein the measurement varies based on the distance between the pinged coil in the array and the secondary coil;
analyzing the measurements using triangulation to determine the position of the secondary coil of the secondary device.

21. The method of claim 19, wherein the determining the position of the secondary device comprises:
simultaneously pinging a plurality of coils associated with an area of the coil array;
dividing the plurality of coils associated with an area of the coil array into a plurality of areas each associated with one or more coils in the array in response to determining that the secondary coil of the secondary device is within range of the area,;
individually pinging each of the coils associated with each of the plurality of areas to determine if the device is present in that area.

22. The method of claim 19, wherein the power requirement information and the coil information is included within a device classification.

23. The method of claim 19, wherein the determining of the subset of coils to select of the selectable coil array to provide power to the secondary coil of the secondary device as a function of the position of the secondary coil of the secondary device on the charging surface includes selecting the first subset of coils of the selectable coil array to generate a peak magnetic field at the location of the secondary coil of the secondary device.

24. The method of claim 19, including determining whether a parasitic load is present on the charging surface and determining the subset of coils to select of the selectable coil array to provide power to the secondary coil of the secondary device as a function of the parasitic load.

25. The method of claim 19,
wherein each of the two or more coils of the plurality of coils is electrically connected with a separate series resonant capacitor and
wherein a resonance point of the one or more coils is maintained independent of the number of coils selectively electrically connected in parallel in the selectable coil array.

26. The method of claim 19, wherein the determining the position of the secondary device comprises:

pinging the plurality of coils;
obtaining position information as a function of the pinging;
analyzing the position information to determine the position of the secondary coil with respect to the position of the pinged coils in the array.

27. The method of claim 26, wherein the obtaining position information as a function of pinging includes detecting changes in reflected impedance in the coil array indicative of the amount of power received by the secondary coil or receiving position information transmitted by the secondary device.

* * * * *